United States Patent
Kristinsson et al.

[11] 3,886,274
[45] May 27, 1975

[54] CONTROL OF ANIMAL PESTS WITH 3H-OXAZOL-[4,5-6]PYRIDINE-2-ONE ESTERS OF 3-(-O-)OR (-S-)-O,O'DI(LOWER ALKYL) PHOSPHATES AND THIOPHOSPHATES

[75] Inventors: Haukur Kristinsson, Bottmingen; Kurt Rufenacht, Basel, both of Switzerland

[73] Assignee: Ciba-Geigy Corporation, Ardsley, N.Y.

[22] Filed: Jan. 21, 1974

[21] Appl. No.: 435,065

Related U.S. Application Data

[60] Division of Ser. No. 156,983, June 25, 1971, Pat. No. 3,808,218, which is a continuation-in-part of Ser. No. 155,604, June 22, 1971, abandoned.

[30] Foreign Application Priority Data
June 26, 1970 Switzerland................ 9702/70

[52] U.S. Cl............................. 424/200; 424/DIG. 8
[51] Int. Cl............................ A01n 9/36; A61d 7/00
[58] Field of Search.................... 424/200, DIG. 8

[56] References Cited
UNITED STATES PATENTS
2,984,669   5/1961   Brahler et al................ 260/307 C Primary Examiner—Stanley J. Friedman
Assistant Examiner—Allen J. Robinson
Attorney, Agent, or Firm—Harry Falber; Frederick H. Rabin

[57] ABSTRACT

Methods and compositions utilizing sulphur containing phosphorus compounds of pyrido-oxazole derivatives for combating various animal and vegetable pests, with particular emphasis against insects and representatives of the order Acarina, are disclosed. The new compounds correspond to the formula

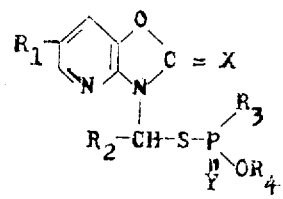

wherein $R_1$ represents halogen or nitro, $R_2$ represents hydrogen or lower alkyl, $R_3$ represents alkyl, alkoxy, alkenyloxy, alkynyloxy, phenyl, amino, monoalkylamino or dialkyl-amino, $R_4$ represents alkyl, alkenyl or alkynyl, and X and Y each represent oxygen or sulphur.

16 Claims, No Drawings

CONTROL OF ANIMAL PESTS WITH 3H-OXAZOL-[4,5-6]PYRIDINE-2-ONE ESTERS OF 3-(O-)OR (-S-)-0,0'DI(LOWER ALKYL) PHOSPHATES AND THIOPHOSPHATES

This is a division of application Ser. No. 156,983, filed on June 25, 1971 now U.S. Pat. No. 3,808,218 which in turn is a continuation-in-part of application Ser. No. 155,604, filed on June 22, 1971, now abandoned.

DESCRIPTION OF THE INVENTION

The present invention relates to new organic phosphorus compounds, processes for their manufacture, insecticidal and acaricidal preparations that contain these new compounds and their use in combating animal and vegetable pests.

The new organic phosphorus compounds correspond to the formula

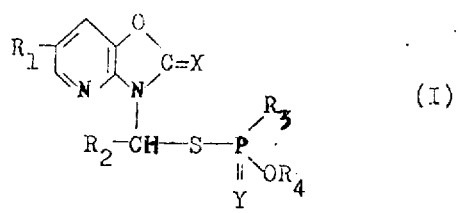

wherein $R_1$ represents hydrogen, halogen or nitro, $R_2$ represents hydrogen, methyl, chloromethyl or bromomethyl, $R_3$ represents alkyl, alkoxy, alkenyloxy, alkynyloxy, alkoxyalkoxy, halogenalkoxy, phenyl, amino, monoalkylamino or dialkylamino, $R_4$ represents alkyl, alkenyl, alkynyl, alkoxyalkyl or halogenoalkyl and X and Y each represents oxygen or sulphur.

For $R_1$ representing halogen, fluorine, chloride, bromine or iodine, but especially chlorine or bromine, are suitable.

Alkyl, alkenyl or alkynyl chains that are possible for $R_3$ and $R_4$ contain as lower hydrocarbon radicals or as the hydrocarbon part of alkoxy, alkenyloxy, alkynyloxy, alkoxyalkoxy and alkylamino radicals $R_3$ and $R_4$ at the most 6, preferably at the most 4, carbon atoms and may be straight or branched.

Exemplary of such radicals are, interalia, methyl, ethyl, n-propyl, isopropyl, n-, i-, sec.-, tert,-butyl, allyl, crotonyl, methallyl, propargyl, n-butynyl.

Particular importance attaches to compounds of the formula I wherein $R_1$ represents hydrogen, chlorine, bromine or nitro, $R_2$ has the meaning given under formula I above, $R_3$ represents an alkyl, alkoxy, alkenyloxy, alkoxyalkoxy, or halogenoalkoxy radical, each radical $R_3$ containing at the most 4 carbon atoms, or a phenyl radical, amino radical or dialkylamino radical with 2 to 4 carbon atoms, $R_4$ represents an alkyl, alkenyl, alkoxyalkyl or halogenoalkyl radical with at the most 4 carbon atoms and X and Y represent oxygen or sulphur.

The compounds of the formula I are manufactured by reacting an oxazolo (4,5-b)pyridine derivative of the formula

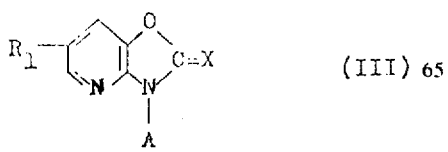

wherein A represents the halogenmethyl radical, the vinyl group or a 1,2-dihalogenethyl radical, with a phosphorus compound of the formula

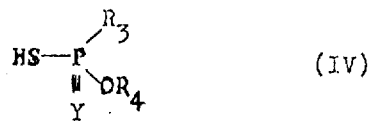

optionally in the presence of an acid binding agent, or with a salt thereof. In the formulae III and IV, the symbols $R_1$ to $R_4$, X and Y, having the meanings given for formula I.

The phosphorus compounds of the formula IV react with the oxazolo4,5-b)pyridine derivatives of the formula III without further difficulties at temperatures between 0° and 120°C, preferably at 10° to 70°C. It is advisable to carry out the process according to the invention in the presence of a solvent or diluent that is inert towards the reactants. Possible solvents or diluents are primarily aliphatic ketones, such as acetone, methyl ethyl ketone; alkanols such as methanol, ethanol, isopropanol; esters, such as ethyl acetate; nitriles; N-alkylated acid amides; aromatic hydrocarbons, such as benzene, toluene and water, and mixtures of such solvents with water.

The reaction of a compound of the formula III, in which A represents halogen-methyl or 1,2-dihalogenmethyl, with a compound of the formula IV takes place accompanied by the exchange of the, or a, halogen atom; in the process, the halogen atom in the 1-position in the 1,2-dihalogen-ethyl radical is exchanged. The reaction is therefore carried out by adding acid binding agents or with salts, especially with alkali metal salts and ammonium salts of the phosphorus compounds of the formula III. Preferred acid binding agents are the alkali metal hydroxides and carbonates; however, tertiary nitrogen bases can also be used. If A represents the vinyl group, the phosphorus compound of the formula IV adds on to the vinyl double bond.

As examples of possible starting materials of the formula III, the following may, inter alia, be considered for the process according to the invention:

3-chloromethyl-oxazolo[4,5-b]pyridin-2(3H)-one
3-chloromethyl-oxazolo[4,5-b]pyridin-2(3H)-thione
3-chloromethyl-6-chloro-oxazolo[4,5-b]pyridin-2(3H)-one
3-bromomethyl-6-chloro-oxazolo[4,5-b]pyridin-2(3H)-one
3-chloromethyl-6-bromo-oxazolo[4,5-b]pyridin-2(3H)-one
3-chloromethyl-6-nitro-oxazolo[4,5-b]pyridin-2(3H)-one
3-vinyl-oxazolo[4,5-b]pyridin-2(3H)-one
3-vinyl-oxazolo[4,5-b]pyridin-2(3H)-thione
3-vinyl-6-chloro-oxazolo[4,5-b]pyridin-2(3H)-one
3-vinyl-6-bromo-oxazolo[4,5-b]pyridin-2(3H)-one
3-vinyl-6-nitro-oxazolo[4,5-b]pyridin-2(3H)-one
3-(1',2'-dichloroethyl)-oxazolo[4,5-b]pyridin-2-(3H)-one
3-(1',2'-dibromoethyl)-oxazolo[4,5-b]pyridin-2(3H)-one
3-(1',2'-dichloroethyl)-oxazolo[4,5-b]pyridin-2(3H)-thione
3-(1',2'-dibromomethyl)-oxazolo[4,5-b]pyridin-2(3H)-thione 3-(1',2'-dichloroethyl)-6-chloro-oxazolo[4,5-b]pyridin-2(3H)-one
3-(1',2'-dibromoethyl)-6-chloro-oxazolo[4,5-b]pyridin-2(3H)-one
3-(1',2'-dichloroethyl)-6-bromo-oxazolo[4,5-b]pyridin-2(3H)-one
3-(1',2'-dibromoethyl)-6-bromo-oxazolo[4,5-b]pyridin-2(3H)-one
3-(1',2'-dichloroethyl)-6-nitro-oxazolo[4,5-b]pyridin-2(3H)-one
3-(1',2'-dibromoethyl)-6-nitro-oxazolo[4,5-b]pyridin-2(3H)-one The following thiophosphoric acids, thiophosphonic acids and thiophosphoric amides may be mentioned, inter alia, as examples of phosphorus compounds of the formula IV:

O,O-dimethyl-dithiophosphoric acid
O,O-dimethyl-monothiophosphoric acid
O,O-diethyl-dithiophosphoric acid
O,O-diethyl-monothiophosphoric acid
O,O-di-isopropyl-dithiophosphoric acid
O-methyl-O-ethyl-dithiophosphoric acid
O-methyl-O-isopropyl-dithiophosphoric acid
O-methyl-O-isopropyl-dithiophosphoric acid
O,O-diallyl-dithiophosphoric acid
O,O-bis-(2-methoxy-ethyl)-dithiophosphoric acid
O,O-bis-(2-ethoxy-ethyl)-dithiophosphoric acid
O,O-bis-(2-chloroethyl)-dithiophosphoric acid
O-methyl-dithio-methylphosphonic acid
O-ethyl-dithio-methylphosphonic acid
O-methyl-dithio-ethylphosphonic acid
O-ethyl-dithio-ethylphosphonic acid
O-methyl-dithio-phenylphosphonic acid
O-ethyl-dithio-phenylphosphonic acid
O-methyl-thiophosphoric acid amide
O-ethyl-thiophosphoric acid amide
O-isopropyl-thiophosphoric acid amide
O-methyl-thiophosphoric acid-methyl amide
O-ethyl-thiophosphoric acid-methyl amide
O-methyl-thiophosphoric acid-ethyl amide
O-ethyl-thiophosphoric acid-ethyl amide
O-methyl-thiophosphoric acid-dimethyl amide
O-ethyl-thiophosphoric acid-dimethyl amide
O-methyl-thiophosphoric acid-diethyl amide
O-methyl-thiophosphoric acid-diethyl amide
O-methyl-dithiophosphoric acid-dimethyl amide
O-ethyl-dithiophosphoric acid-dimethyl amide
O-methyl-dithiophosphoric acid-diethyl amide
O-ethyl-dithiophosphoric acid-diethyl amide
O-isopropyl-dithiophosphoric acid-dimethyl amide The phosphorus compounds of the formula IV can be manufactured according to known processes.

The starting materials of the formula III have not been described hitherto. The oxazolo[4,5-b]-pyridine derivatives of the formula III, in which A represents a halogen-methyl radical, are manufactured by converting an oxazolo[4,5-b]pyridine of the formula V

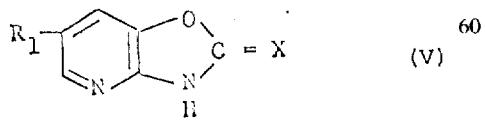

initially with formaldehyde into the corresponding 3-hydroxy-methyl compound and reacting this with a halogenating agent to give the corresponding 3-chloromethyl resp. 3-bromoethyl-oxazolo[4,5-b]pyridine derivatives. As halogenating agents there may be used: thionyl chloride, phosphorus trichloride and phosphorus tribromide, phosphorus pentachloride and phosphorus pentabromide, phosphorus oxyhalides, etc. Since in the case of these oxazolo[4,5-b]pyridines there occurs no salt formation with the hydrogen halide that is split off, the addition of an acid binding agent can be dispensed with.

The starting materials of the formula III, in which A represents the vinyl group or a 1,2-dihalogen-ethyl radical, are obtained by reacting an oxazolo[4,5-b]pyridine of the formula IV with vinyl acetate in the presence of mercury salts of strong acids [H. Hopff et al., Helv.chim.Acta 18, 135–140 (1960)] to give the corresponding 3-vinyl-oxazolo[4,5-b]pyridine derivatives. It is also possible, moreover, to obtain such compounds by splitting off 3-(2'-hydroxyethyl) and 3-(2'-acetoxyethyl) derivatives) by heating or by reacting an oxazolo[4,5-b]pyridine of the formula V with acetylene. The 3-(1',2'-dihalogenethyl)-oxazolo[4,5-b]pyridine derivatives are then obtained by the addition of halogen, such as chlorine or bromine, to the vinyl group.

These reactions are carried out preferably in a solvent or diluent that is inert, or in solvent mixtures that are inert, towards the reactants. The hydroxymethyl group is introduced advantageously in an aqueous medium; the subsequent halogenation to the halogen-methyl group, likewise the addition of halogen to the vinyl group, in a halogenated hydrocarbon, such as chloroform, carbon tetrachloride, halogenated ethylenes and the like. In addition, aromatic hydrocarbons such as benzene, chlorobenzene and the like can also be used.

The reaction temperatures are in the range from 0° to 120°C. The starting materials of the formula III are obtained in good yield and purity. They can be used directly for the reactions according to the invention without further purification.

The oxazolo[4,5-b]pyridine-2(3H)-ones represented by formula IV can be theoretically in a tautomeric form, represented by the formula IVa, as oxazolo[4,5-b]pyridine-2(4H)-ones. In this case, the acid NH-group would therefore be in the pyridine ring instead of in the oxazolo ring. The claimed compounds of the formula I could accordingly also be written as 4-substituted isomers, corresponding to an alternative formula Ia. However, since all claimed compounds and all their primary products always occur only in a single form, they are cited here for reasons of consistency and simplicity as 3-substituted isomers, both by formula and nomenclature.

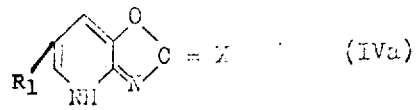

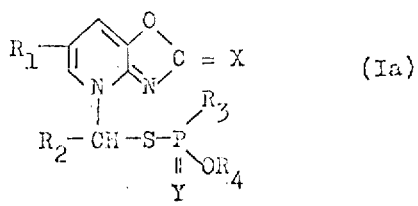

The compounds of the formula I are suitable for combating various animal and vegetable pests. They are particularly suitable for combating insects and representatives of the order Acarina. These acive substances have a good to very good contact action and ingested action combined with systematic action, and are of particular importance in combating insects that eat plants and suck the juice of plants, representatives of the order Acarina, as well as the development stages of these pests. By such pests are to be understood in particular those that belong to the following families:

| | | |
|---|---|---|
| Acrididae: | e.g. | Locusta spp. |
| | | Schistocerca spp. |
| Phlocothripidae: | e.g. | Heliothrips haem. |
| Miridae: | e.g. | Distantiella theobroma |
| | | Sahlbergella singularis |
| Piesmidae: | e.g. | Piesma quadrata |
| Lygaeidae: | e.g. | Lygus spp. |
| Pyrrhocoridae: | e.g. | Dysdercus spp. |
| Jassidae: | e.g. | Cicadula spp. |
| | | Typhlocyba spp. |
| | | Empoasea spp. |
| Psyllidae: | e.g. | Psylla spp. |
| Aleyodidae: | e.g. | Trialeurodes spp. |
| Aphididae: | e.g. | Macrosiphon spp. |
| | | Aphis spp. |
| | | Myzodes spp. |
| Eriosomatidae: | e.g. | Eriosoma spp. |
| Pseudoococcidae: | e.g. | Planococcus citri |
| Lecaniidae: | e.g. | Coccus spp. |
| Stictococcidae: | e.g. | Stictococcus spp. |
| Diaspididae: | e.g. | Quadrispidiotus pern. |
| Tenthredinidae: | e.g. | Athalia rosae |
| | | Hoplocampa spp. |
| Silphidae: | e.g. | Blitophaga opaca |
| Chrysomelidae: | e.g. | Leptinotarsus dec. |
| | | Melasoma spp. |
| | | Lema spp. |
| | | Phyllotreta spp. |
| | | Diabrotica spp. |
| Curcuionidae: | e.g. | Sitona lineata |
| | | phyllobius spp. |
| | | Otiorrhynchus spp. |
| | | Ceutorrhynchus spp. |
| | | Anthonomus spp. |
| | | Phytonomus spp. |
| | | Cylas spp. |
| | | Apion spp. |
| Scolytidae: | e.g. | Scolytus spp. |
| | | Dendroctonus spp. |
| | | Blastophagus spp. |
| | | Hypothemus hampei |
| Scarabaeidae: | e.g. | Melolontha spp. |
| | | Rhizotrogus spp. |
| | | Pachnoda spp. |
| Pyralidae: | e.g. | Diatraea saccharalis |
| Pyraustidae: | e.g. | Ostrinia nubilalis |
| Crambidae: | e.g. | Chilo spp. |
| Schoenobiidae: | e.g. | Schoenobius spp. |
| Tortricidae: | e.g. | Pandemis spp. |
| | | Carbocapsa pom. |
| | | Grapholita spp. |
| | | Epinotia spp. |
| | | Conchylis ambiguella |
| | | Zeiraphera diniana |
| | | Tortrix spp. |
| Gelechiidae: | e.g. | Phthorimaea spp. |
| | | Pectinophora goss. |
| Gracilariidae: | e.g. | Lithocolletis spp. |
| Lyonetiidae: | e.g. | Lyonetia spp. |
| | | Leucoptera coff. |
| Yponomeutidae: | e.g. | Hyponomeuta spp. |
| Argyresthiidae: | e.g. | Argyresthia ephip. |
| Plutellidae: | e.g. | Plutella maculipennis |
| Acrolepiidae: | e.g. | Acrolepia assectella |
| Hepialidae: | e.g. | Hepialus spp. |
| Lasiocampidae: | | |
| Pieridae: | e.g. | Pieris spp. |
| | | Catopsilia spp. |
| Geometridae: | e.g. | Operiphthera spp. |
| | | Erannis spp. |
| | | Selenia spp. |
| Lymantriidae: | e.g. | Lymantria dispar |
| Noctuidae: | e.g. | Spodoptera littoralis |
| | | Heliothis zea |
| | | Mamestra spp. |
| | | Scotia spp. |
| | | Orthosia spp. |

| | | |
|---|---|---|
| Trypetidae: | e.g. | Ceratitis capitata |
| | | Dacus oleae |
| Drosophilidae: | e.g. | Drosophila spp. |
| Agromyzidae: | e.g. | Phytomyza rufipes |
| | | Agromyza megalopsis |
| | | Saptomyza flaveola |
| Chloropidae: | e.g. | Oscinis frit |
| | | Chlorops spp. |
| Muscidae: | e.g. | Hylemya brassicae |
| | | Hylemya antiqua |
| | | Hylemya floralis |
| | | Pegomya hyoscyani |
| Tarsonemidae: | e.g. | Tarsonemus fragaria |
| Tetranychidae: | e.g. | Tetranychus urticae |
| | | Panonychus ulmi |
| Eriophyidae: | e.g. | Eriophyes ribis |
| | | Aceria sheldoni |
| | | Phyllocoptrupa oleivorus |

Furthermore, the new active substances can also be used for combating various storage pests such, for example, as grain weevils, bean weevils and bacon beetles, as well as insects of the family Blattidae.

Due to their slight toxicity to warm blooded animals, the new organic phosphorus compounds of the formula I are of particular importance in combating insects occuring ectoparasitically on animals, representatives of the order Acarina and their development stages. By such pests are to be understood in particular those that belong to the following families:

| | | |
|---|---|---|
| Muscidae: | e.g. | Musca domestica |
| | | Stomoxys calcitrans |
| Calliphoridae: | e.g. | Calliphora erythrocephala |
| | | Lucilia cuprina |
| | | callitroga hominivorax |
| Gastrophilidae: | e.g. | Gastrophilus intestinalis |
| Hypodermatidae: | e.g. | Hypoderma bovis |
| | | Dermatobia irritans |
| Hippoboscidae: | e.g. | Melophagus ovinus |
| Oestridae: | e.g. | Oestris ovis |
| Tabanidae: | e.g. | Tabanus bovinus |
| Culicidae: | e.g. | Anopheles spp. |
| | | Culex spp. |
| | | Aedes spp. |
| Simuliidae: | e.g. | Simulium sericatum |
| Lipeuridae: | e.g. | Lipeurus baculus (Mallophag) |
| Phthiriidae: | e.g. | Phthirus pubis |
| Pediculidae: | e.g. | Pediculus corporis |
| Pulicidae: | e.g. | Ctenocephalides canis |
| | | Ctenocephalides felis |
| Tungidae: | e.g. | Tunga penetrans |
| Argasidae: | e.g. | Ornithodorus moubata |
| | | Argas reflexus |
| Ixodidae: | e.g. | Ixodes ricinus (3-phase) |
| | | Dermacentor reticulatus (3-phase) |
| | | Rhipicephalus spec. (2-phase) |
| | | Rhipicephalus appendiculatus |
| | | Rhipicephalus everbi |
| | | Boophilus microplus (1-phase) |
| | | Boophilus decoloratus |
| | | Amblyoma spec. |
| Dermanyssidae: | e.g. | Dermanyssus gallinae |
| | | Bdellonyssus bacoti |
| Demodicidae: | e.g. | Demodex canis |
| Trombiculidae: | e.g. | Trombicula autumnalis |
| Sarcoptidae: | e.g. | Sarcoptes spp. |
| Psoroptidae: | e.g. | Psoroptes spp. |

In admixture with other insecticides or acaricides, the activity spectrum of the active substances according to the invention can be broadened and, in particular, the insecticidal and acaricidal action improved. Exemplary of suitable additives for broadening the action are, for example: insecticidal and/or acaricidal esters and amides of phosphoric acid, phosphonic acid, thio- and dithiophosphonic acid, halogenated hydrocarbons and and analogues of DDT active substance, as well as pyethrines, esters of halobenzilic acid, oxicarbamates, arylcarbamates and and carbamates of enolisable heterocycles.

Some of the new phosphorus compounds of the formula I are further suitable for combating endoparasites, especially parasitic helminths and their development stages such, for example, as representatives of the families Ascaridae, Trichostrongylidae, Ancylostanatidae, in domestic and farm animals such as cattle, sheep, goats, horses, pigs, cats, dogs and poultry.

The active substances are non-toxic in the concentrations used for combating endoparasites, and are very well tolerated by domestic and farm animals.

The active substances of the formula I can be used as pure active substance or together with suitable carriers and/or additives. Suitable carriers and additives may be solid or liquid and correspond to the substances conventionally used in formulation technique.

The preparations according to the invention are manufactured in known manner by intimately mixing and grinding the active substances of the formula I together with suitable carriers, optionally with the addition of dispersing agents or solvents that are inert towards the active substances. The active substances can be in the form of and used in the following preparations:
solid preparations:
dusting agents, scattering agents, granulates, coated granulates, impregnated granulated granulates and homogeneous granulates;
liquid preparations:
a. active substance concentrates that are dispersable in water: wettable powders, pastes, emulsions;
b. solutions.

To produce dusts, scattering agents and granulates the active substances are mixed with solid carriers. Examples of carriers which can be employed are kaolin, talcum, bole, loess, chalk, limestone, ground limestone, Attaclay, dolomite, diatomaceous earth, precipitated silicic acid, alkaline earth silicates, sodium and potassium aluminium silicates (feldspar and mica), calcium and magnesium sulfates, magnesium oxide, ground synthetic plastics, fertilizers such as ammonium phosphates, ammonium nitrate, urea, ground vegetable products such as bran, bark dust, sawdust, ground nutshells, cellulose powder, residues of plant extractions, active charcoal, etc. Those carriers can be used alone or admixed with each other.

The particle size of the carriers is, for dusts advantageously up to about 0.1 mm, for scattering agents from about 0.075 to 0.2 mm, and for granulates 0.2 mm or coarser.

The concentrations of active substance in the solid preparations are usually from 0.5 to 80%.

To these mixtures can also be added additives which stabilize the active substance and/or non-ionic, anionic and cationic surface active substances, which for example improve the adhesion of the active ingredients on plants or parts of plants (adhesives and agglutinants) and/or ensure a better wettability (wetting agents) and dispersibility (dispersing agents). Examples of suitable adhesives are the following: olein/chalk mixture, cellulose derivatives (methyl cellulose, carboxymethyl cellulose), hydroxyethyl glycol ethers of monoalkyl and dialkyl phenols having 5 to 15 ethylene oxide radicals per molecule and 8 to 9 carbon atoms in the alkyl radical, lignin sulfonic acids, their alkali metal and alkaline earth metal salts, polyethylene glycol ethers (Carbowaxes) fatty alcohol polyethylene glycol ethers having 5 to 20 ethylene oxide radicals per molecule and 8 to 18 carbon atoms in the fatty alcohol moiety, condensation products of ethylene oxide/propylene oxide, polyvinyl pyrrolidones, polyvinyl alcohols, condensation products os urea and formaldehyde, and also latex products.

The water-dispersible concentrates of the active substance, i.e. wettable powders, pastes and emulsifiable concentrates, are agents which can be diluted with water to any concentration desired. They consist of active substance, carrier, optionally additives which stabilize the active substance, surface-active substances and anti-foam agents and, optionally, solvents. The concentration of active substance in these agents is 5 to 80%.

Wettable powders and pastes are obtained by mixing and grinding the active substances with dispersing agents and pulverulent carriers in suitable apparatus until homogeneity is attained. Carriers are, for example, those mentioned for the solid forms of application. In some cases it is advantageous to use mixtures of different carriers. As dispersing agents there can be used, for example, condensation products of sulfonated naphthalene and sulfonated naphthalene derivatives with formaldehyde, condensation products of naphthalene or naphthalene sulfonic acids with phenol and formaldehyde, as well as alkali, ammonium and alkaline earth metal salts of lignin sulfonic acid, in addition, alkylaryl sulfonates, alkali and alkaline earth metal salts of dibutyl naphthalene sulfonic acid, fatty alcohol sulfates such as salts of sulfated hexadecanols, heptadecanols, octadecanols, and salts of sulfated fatty alcohol glycol ethers, the sodium salt of oleoyl ethionate, the sodium salt of oleoyl methyl tauride, ditertiary acetylene glycols, dialkyl dilauryl ammonium chloride and fatty acid alkali and alkaline earth metal salts.

Suitable anti-foam agents are silicones.

The active substances are so mixed, ground, sieved and strained with the additives mentioned above that, in wettable powders, the solid particle size of from 0.02 to 0.04 and in pastes, of 0.03 is not exceeded. To produce emulsifiable concentrates and pastes, dispersing agents such as those given in the previous paragraphs, organic solvents and water are used. Examples of suitable solvents are the following: alcohols, benzene, xylenes, toluene, dimethyl sulfoxide, and mineral oil fractions boiling between 120° and 350°C. The solvents must be practically odorless, not phytotoxic, inert to the active substances and not readily inflammable.

Furthermore, the agents according to the invention can be applied in the form of solutions. For this purpose the active substance or several active substances of general Formula I are dissolved in suitable organic solvents, mixtures of solvents or in water. Aliphatic and aromatic hydrocarbons, chlorinated derivatives thereof, alkyl naphthalenes, and mineral oils, alone or mixed with each other, can be used as organic solvents. The solution should contain the active substances in a concentration of from 1 to 20%.

The preparation according to the invention may also be mixed, for example, with fungicides, bactericides, fungistatics, bacteriostatics or nematocides, in addition to the insecticides and acaricides, in order to broaden the activity spectrum. The preparations according to the invention may also contain plant fertilisers, trace elements etc.

The content of active substance in the above described preparations varies from 0.1 to 95%, and in this connection it should be mentioned that an application from an aircraft or by some other suitable means of application, concentrations of up to 99.5% or even pure active substance may be used.

In the Examples that follow, preparations of the new active substances of the formula I are described. The parts denote parts by weight.

Dusting agents

The following substanes are used for the manufacture of (a) a 5% (b) a 2% dusting agent:

a. 5 parts of active substance of the formula I, e.g. O,O-dimethyl-S-(6-chloro-oxazolo [4,5-b]-pyridin-2(3H)-onyl-(3)-methyl)-dithiophosphate
10 parts of magnesium carbonate
85 parts of talcum b. 2 parts of O,O-diethyl-S-(6-chloro-oxazolo[4,5-b]pyridin-2(3H)-onyl-(3-)methyl)-dithiophosphate
1 part of highly dispersed silica
97 parts of talcum The active substances are mixed with the carriers.

Granulate

The following substances are used to manufacture a 5% granulate:

5 parts of the active substance of the formula I, e.g. O,O-diethyl-S-(6-chloro-oxazolo[4,5-b]pyridin-2(3H)-onyl(3-)methyl)-dithiophosphate
0.5 parts of epoxidised vegetable oil
1 part of highly dispersed silica
93.5 parts of kaolin (0.4 – 0.8 mm particle size)

The active substance is mixed with the vegetable oil and the silica and dissolved in 6 parts of acetone. The resulting suspension is sprayed onto kaolin and the acetone subsequently evaporated in vacuo.

Wettable Powder

The following constituents are used to manufacture a (a) 40%, (b) a 50%, (c) a 25% and (d) a 10% wettable powder:

a. 40 parts of active substance of the formula I, e.g. O,O-dimethyl-S-(oxazolo[4,5-b]pyridin-2(3H)-onyl-(3)-methyl)-dithiophosphate
5 parts of the sodium lignin sulphonate
1 part of the sodium dibutyl naphthyl sulphonate
54 parts of silica b. 50 parts of the active substance of the formula I, e.g.
O,O-diethyl-S-(oxazolo[4,5-b]pyridin-2(3H)-onyl(3)-methyldithiophosphate
5 parts of alkylaryl sulphonate ("Tinovetin B")
10 parts of calcium lignine sulphonate
1 part of Champagne chalk-hydroxyethyl cellulose mixture (1:1)
20 parts of silica
14 parts of kaolin;

c. 25 parts of the active substance of the formula I, e.g. O,O-diethyl-S-(6-chloro-oxazolo[4,5-b]-pyridin-2(3H)-onyl(3)-methyl)-thiophosphate
3 parts of a mixture of the sodium salts of saturated fatty alcohol sulphates
5 parts of naphthalene sulphonic acid/formaldehyde concentrate
82 parts of kaolin. The active substances are intimately mixed with the additives in suitable mixers and ground on mills and rollers. Wettable powders are obtained which can be diluted with water to form suspensions of any desired concentration.

Emulsifiable concentrate

The following constituents are mixed together to manufacture (a) a 10% and (b) a 20% emulsifiable concentrate:

a. 10 parts of active substance of the formula I, e.g. O,O-dimethyl-S-[6-chloro-oxazolo[4,5-b]-pyridin-2(3H)-onyl-(3)-methyl]-dithiophosphate
10 parts of a composite emulsifier (fatty alcohol polyglycolether and ethyl arylsulphonate)
40 parts of dimethylcyclohexylphthalate
40 parts of tetralin;

b. 20 parts of active substance of the formula I, e.g. O,O-diethyl-S-[6-chloro-oxazolo[4,5-b]-pyridin-2(3H)-onyl(3)-methyl]-dithiophosphate
20 parts of dioxane
10 parts of a composite emulsifier (fatty alcohol polyglycolether and alkylaryl sulphonate)
50 parts of tetralin. This concentrate can be diluted with water to form emulsions of any desired concentration.

Spray

The following constituents are used to manufacture (a) a 5% and (b) a 2% spray:

a. 5 parts of active substance of the formula I, e.g. O,O-dimethyl-S-[oxazolo[4,5-b]pyridin-2(3H)-onyl-(3)-methyl]-dithiophosphate
1 part of epichlorohydrin
94 parts of petroleum ether (boiling limits 160°–190°C);

b. 2 parts of active substance of the formula I, e.g. O,O-dimethyl-S-[6-chloro-oxazolo[4,5-b]-pyridin-2(3H)-onyl(3)-methyl]-dithiophosphate
3 parts of 4,4'-dichlorodiphenyl-trichloroethane
95 parts of kerosene.

These solutions are sprayed with a pressure sprayer. Anti-helminthic preparations of the new phosphorus compounds of the formula I are described herewith below. The parts denote parts by weight.

Active substance concentrate in paste form

Such semisolid or oily active substance concentrates have, for example, the following composition:

a. 40 parts of active substance of the formula I, e.g. O,O-diethyl-S-[6-chloro-oxazolo[4,5-b]pyridin-2(3H)-only-(3)-methyl]-dithiophosphate
10 parts of bolus alba
2 parts of sodium lignin sulphonate
0.2 parts of sodium benzoate
1.0 part of carboxymethyl cellulose
46.8 parts of water;

b. 30 parts of active substance of the formula I, e.g. O,O-bis-(2'-chloroethyl)-S-[oxazolo[4,5-b]-pyridin-2(3H)-onyl-(3)-methyl]-dithiophosphate
70 parts of ground-nut oil.

The active substances are very finely ground with the carriers, dispersants and other additives (particle size 5–10 microns).

Powder concentrate

The following substances are used to manufacture (a) a 50% and (b) a 25% powder concentrate:

a. 50 parts of active substance of the formula I, e.g.

O,O-diethyl-S-[oxazolo[4,5-b]pyridin-2(3H)-onyl-(3)-methyl]-dithiophosphate
 3 parts of polyoxyethylene-sorbitan-monooleate
 3 parts of sodium lignin sulphonate
 44 parts of bolus alba;
b. 25 parts of active substance of the formula I, e.g.
O,O-diethyl-S-[oxazolo[4,5-b]pyridin-2(3H)-thione-3-onyl-methyl]-dithiophosphate
 8 parts of polyvinyl pyrrolidone
 3 parts of dodecylbenzenesulphonate
 39 parts of diatomaceous earth
 30 parts of bolus alba. The indicated active substances are applied to the carriers, for example in the form of acetonic solutions. The dispersants and wetting agents are added subsequently and the concentrate is ground to homogeneity.

Example 1 a. One hundred and nine grams oxazolo[4,5-b]pyridine-2-(3H)-one J. Frazer and E. Tittenser, J. Chem. Soc. (London) 1957, 4625 are stirred in a mixture of 100 g of approx. 37% aqueous formaldehyde solution and 600 ml of water for ½ hour at room temperature and for ½ hour at 50°–60°C. After cooling, filtration and drying to filtrate, 126 g of 3-hydroxymethyl-oxazolo[4,5-b]-pyridine-2(3H)-one are obtained (m.p. 155°C, with decomp.).

b. One hundred and twenty-six grams of 3-hydroxymethyl-oxazolo[4,5-b]pyridine-2-(3H)-one are suspended in 1200 ml of chloroform. 126 Grams of thionyl chloride are run in rapidly, the mixture is stirred initially for half an hour at room temperature, then for 3 hours at 60°C, cooled and the undissolved impurities are filtered off. The filtrate is evaporated to dryness in a water jet vacuum, the residue mixed with petroleum ether and filtered, to yield 126 g of 3-chloromethyl-oxazolo[4,5-b]pyridine-2(3H)-one (m.p. 109°–111°C).

c. 18.5 Grams of 3-chloromethyl-oxazolo[4,5-b]pyridine-2(3H)-one and 21 g of the ammonium salt of O,O-dimethyldithiophosphate are stirred in 100 ml of acetone for 4 hours at 35°C. 100 Millilitres of water are added and the acetone is distilled off in a water jet vacuum at 35°C. The crystals that have separated out are filtered off and recrystallised from methanol, to yield 20 g of O,O-dimethyl-S-[oxazolo[4,5-b]pyridine-2(3H)-onyl-(3)-methyl]-dithiophosphate (m.p. 70°–71°C).

| Calc. | N 9,15 | P 10,1 | S 20,9 % |
|---|---|---|---|
| Found | N 9,3 | P 10,0 | S 20,9 % |

Example 2

One hundred and ninty-five grams of the potassium salt of O,O-diethyldithiophosphoric acid are covered with a solution of 134 g of 3-chloromethyl-oxazolo[4,5-b]pyridine-2-(3H)-one in 800 ml of acetone. The mixture is stirred for 4 hours at 35°C, then the bulk of the acetone is distilled off in a water jet vacuum and the residue treated with 800 ml of water. The oil that has initially separated out solidifies in crystalline form. Recrystallisation from 350 ml of methanol yields 188 g of O,O-diethyl-S-oxazolo-4,5-b pyridine-2(3H)-onyl(3)-methyl dithiophosphate (m.p. 86°–87°C).

| Calc. | C 39,51 | H 4,53 | N 8,38 | P 9,28 | S 19,18 % |
|---|---|---|---|---|---|
| Found | C 39,55 | H 4,55 | N 8,48 | P 9,19 | S 19,25 % |

Example 3

Sixty-three grams of the potassium salt of O,O-bis-(2-methoxyethyl)-dithiophosphoric acid and 37 g of 3-chloromethyl-oxazolo[4,5-b]pyridine-2(3H)-one are stirred in 300 ml of acetone for 4 hours at 40°C. The solvent is then distilled off in a water jet vacuum, the residue treated with 300 ml of water, and the oil that has separated out is taken up in ether. The ether solution is washed with sodium bicarbonate and water, dried, and the ether is distilled off. The residual oil is freed from volatile fractions by heating to 70°C in a high vacuum and subsequently filtered through an animal charcoal filter.

Sixty-three grams of O,O-bis-(2'methoxy-ethyl)-S-[oxazolo-[4,5-b]pyridine-2(3H)-onyl-(3)-methyl]-dithiophosphate are obtained in the form of a pale yellow, non-distillable oil, which is a single substance in thin-layer chromatogram.

| Calc. | C 39,59 | H 4,86 | N 7,10 | P 7,87 | S 16,26 % |
|---|---|---|---|---|---|
| Found | 40,0 | 4,9 | 6,9 | 7,7 | 16,2 % |

Example 4

Forty-nine grams of O-ethyl-dithio-phenylphosphonic acid and 37 g of 3-chloromethyl-oxazolo[4,5-b]pyridine-2(3H)-one are dissolved in 200 ml of acetone. While stirring, a solution of 9 g of sodium hydroxide in 40 ml of water is added dropwise and the mixture is then heated for 4 hours to 35°C. The acetone is distilled of in a water jet vacuum, the residue treated with 200 ml of water and extracted with ether. The ethereal extract is washed until neutral, dried and distilled off, to leave a rapidly congealing oil. Recrystallisation from 300 ml of methanol yields, 37 g of O-ethyl-S-[oxazolo[4,5-b]pyridine-2(3H)-onyl-(3)-methyl]-dithio-phenylphosphate.

| Calc. | C 49,16 | H 4,13 | N 7,64 | P 8,47 | S 17,50 % |
|---|---|---|---|---|---|
| Found | 49,10 | 4,20 | 7,61 | 8;66 | 17,20 % |

Example 5 a. Two hundred and four grams of oxazolo[4,5-b]pyridine-2(3H)-one are dissolved in 1500 ml of dimethylformamide. At 20°–25°C, 111 g of chlorine are introduced into the solution within 2 hours. The mixture is further stirred for 1 hour and poured into 3 litres of ice water. The product that has crystallised out is filtered off, washed and dried. Two hundred and twelve grams of 6-chloro-oxazolo [4,5-b]pyridine-2-(3H)-one (m.p. 187°–188°C) are obtained.

b. One hundred and thirty-five grams of 6-chloro-oxazolo[4,5-b]pyridine-2-(3H)-one, 800 ml of water and 160 g of an approx. 37% aqueous formaldehyde solution are stirred for ½ hour at room temperature and then for 2 hours at 50°–60°C. The mixture is cooled, the precipitate that forms filtered off, the residue washed with ice water and dried at 40°C in a water jet vacuum. 148 Grams of 3-hydroxymethyl-6-chloro-oxazolo[4,5-b]pyridine-2(3H)-one (m.p. 138°C, with decomp.) are obtained.

c. Two hundred grams of thionyl chloride are rapidly run into a suspension of 240 g of 3-hydroxymethyl-6-chloro-oxazolo[4,5-b]pyridine-2(3H)-one in 1200 ml of chloroform. The mixture is stirred for ½ hour at room temperature, then for 1 hour at 60°C. The by this time clear solution is evaporated to dryness in a water jet vacuum, the residue treated with petroleum pyridine-2(3H)-one (m.p. 104°–106°C) are obtained.

d. Forty-four grams of 3-chloromethyl-6-chloro-oxazolo[4,5-b]pyridine-2(3H)-one and 49 g of the ammonium salt of O,O-diethylmonothiophosphoric acid are stirred in 300 ml of acetone for 4 hours at 60°C. The acetone is distilled off in a water jet vacuum and the residue treated with 300 ml of water. The crystalline precipitate that has formed is filtered off and recrystallised from methanol. 42 Grams of O,O-diethyl-S-[6-chlorooxazolo[4,5-b]pyridine-2(3H)-onyl-(3)-methyl]-dithiophosphate area obtained (m.p. 59°–61°C).

| Calc. | C 37,45 | H 4,00 | N 7,95 | P 8,80 | S 9,09 % |
|---|---|---|---|---|---|
| Found | 37,63 | 4,10 | 8,03 | 8,70 | 9,23 |

Example 6

A solution of 238 g of 3-chloromethyl-6-chloro-oxazolo[4,5-b]pyridine-2(3H)-one in 500 ml of acetone is slowly added dropwise to a suspension of 255 g of the potassium salt of O,O-dimethyldithiophosphoric acid in 500 ml of acetone. The temperature gradually rises to 32°C and the mixture is further stirred for 4 hours at 30°C. The solvent is thereafter stripped off in a water jet vacuum, the residue treated with 100 ml of water, and the oil that has separated out is taken up in ether. The ether solution is washed with sodium hydrogen bicarbonate solution and with water and the ether is dried and distilled. The residue congeals to crystalline form. Recrystallisation from 500 ml of methanol yields, 198 g of O,O-dimethyl-S-[6-chloro-oxazolo[4,5-b]pyridine-2(3H)-methyl]-dithiophosphate (m.p. 78°–80°C).

Example 7

One hundred and sixty-six grams of the potassium salt of O,O-diethyl-dithiophosphoric acid and 135 g of 3-chloromethyl-6-chloro-oxazolo[4,5-b]pyridine-2(3H)-one are dissolved in 800 ml of acetone. The temperature of the reaction mixture slowly rises to 33°C. Six hundred milliliters of water are then added and the bulk of the acetone is distilled off in a water jet vacuum at 35°C. The oil that has initially settled out congeals to crystalline form. Recrystallisation from 500 ml of methanol yields 170 g of O,O-diethyl-S-[6-chloro-oxazolo[4,5-b]pyridine-2(3H)-onyl-(3)-methyl]-dithiophosphate (m.p. 81°–82°C).

| Calc. | C 35,82 | H 3,83 | N 7,60 | P 8,42 | S 17,39 | Cl 9,62 % |
|---|---|---|---|---|---|---|
| Found | 35,85 | 3,80 | 7,64 | 8,31 | 17,34 | 9,97 % |

Example 8

Forty-two grams of O,O-bis-(2-chloroethyl)-dithiophosphoric acid and 35 g of 3-chloromethyl-6-chloro-oxazolo[4,5-b]pyridine-2(3H)-one are dissolved in 150 ml of acetone. A solution of 6.5 g of sodium hydroxide in 65 ml of water is then added dropwise and the mixture is stirred for 4 hours at 40°C.

The acetone is thereafter distilled off in a water jet vacuum, 300 ml of water are added and the oily crystalline precipitation that forms is taken up ether. The ether solution is washed with sodium bicarbonate solution and with water. Recrystallisation twice from a small amount of methanol yields 22 g of O,O-bis-(2'-chloroethyl)-S-[6-chloro-oxazolo-[4,5-b]pyridine-2(3H)-onyl-(3)-methyl]-dithiophosphate (m.p. 71°–73°C).

| Calc. | C 30,18 | H 2,76 | N 6,40 | P 7,09 | S 14,69 | Cl 24,30 % |
|---|---|---|---|---|---|---|
| Found | 30,23 | 2,79 | 6,20 | 6,96 | 14,72 | 24,28 % |

Example 9

Forty-five grams of O-methyl-dithiophenylphosphonic acid are dissolved in 200 ml of acetone. A solution of 9 g of sodium hydroxide in 400 ml of water is then added dropwise. Thereafter 44 g of Ex. 5 (c) are introduced and the reaction mixture is stirred for 4 hours at 35°C. The acetone is then distilled off in a water jet vacuum, the residue treated with 200 ml of water and extracted with ether. The ethereal extract is washed until neutral, dried and the ether distilled off to leave an oil that crystallises gradually.

Recrystallisation from 500 ml of methanol yields 28 g of O-methyl-S-[6-chloro-oxazolo[4,5-b pyridine]-2(3H)-onyl(3)-methyl]-dithio-phenylphosphate (m.p. 105°–107°C).

| Calc. | C 43,47 | H 3,13 | 7,24 | P 8,02 | S 16,57 | Cl 9,17 % |
|---|---|---|---|---|---|---|
| Found | 43,41 | 3,24 | 6,97 | 8,03 | 16,52 | 9,25 % |

| Calc. | C 31,72 | H 2,96 | N 8,23 | P 9,11 | S 18,82 | Cl 10,41 % |
|---|---|---|---|---|---|---|
| Found | 31,83 | 2,95 | 8,28 | 8,89 | 18,53 | 10,63% |

Example 10 a. Two hundred and four grams of oxazolo 4,5-b pyridine-2-(3H)-one are dissolved in 1500 ml of dimethylformamide. Two hundred and sixty-four grams of bromine are slowly added dropwise at room temperature, the mixture is stirred for 1 hour and poured into 9 litres of ice water. The crystalline product that forms is filtered off and dried in vacuo at 50°C, yielding 249 g of 6-bromo-oxazolo[4,5-b]pyridine-2(3H)-one (m.p. 230°–232°C).

b. One hundred and seventy-three grams of 6-bromo-oxazolo[4,5-b]-pyridine-2(3H)-one, 900 ml of water and 100 g of an approx. 37% aqueous formaldehyde solution are stirred for ½ hour at room temperature and then for 1 hour under reflux. The mixture is cooled, the precipitate that forms is filtered off, washed with ice water and dried at 40°C in vacuo, yielding 184 g of 3-hydroxymethyl-6-bromoxazolo[4,5-b]pyridine-2(3H)-one (decomp. at 130°C; with splitting off of formaldehyde).

c. One hundred and thirty-three grams of thionyl chloride are run rapidly into a suspension of 183 g of 6-bromo-oxazolo[4,5-b]-pyridine-2(3H)-one in 1500 ml of chloroform. The mixture is stirred for ½ hour at room temperature and then for 2 hours at 60°C. The by now clear solution is evaporated to dryness in a water jet vacuum, the residue mixed with petroleum, filtered off and dried, yielding 192 g of 3-chloromethyl-6-bromo-oxazolo[4,5-b]pyridine-2(3H)-one (m.p. 129°–130°C).

d. One hundred and sixteen Grams of 3-chloromethyl-6-bromo-oxazolo [4,5-b]pyridine-2(3H)-one and 119 g of the potassium salt of O,O-diethyldithiophosphoric acid are stirred for 4 hours at 35°C in 600, l of acetone. The acetone is then distilled off in vacuo and the residue treated with 600 ml of water. The oil that has separated out congeals to a crystalline form after it has been thoroughly stirred. Recrystallisation from methanol yields 136 g of O,o-diethyl-S-[6-bromo-oxazolo[4,5-b]pyridine-2(3H)-onyl-(3)-methyl]-dithiophosphate (m.p. 98°–99°C).

| | | | | | |
|---|---|---|---|---|---|
| Calc. | C 31,97 | H 3,42 | N 6,78 | P 7,51 | S 15,52 % |
| Found | 32,09 | 3,37 | 6,87 | 7,36 | 15,48 % |
| Calc. | Br 19,33 % | | | | |
| Found | 19,88 % | | | | |

EXAMPLE 11

A solution of 26.4 g of 3-chloromethyl-6-bromo-oxazolo[4,5-b]pyridine-2(3H)-one in 190 ml of acetone are added dropwise to a suspension of the potassium salt of O,O-dimethyldithiophosphoric acid in 40 ml of acetone and the mixture is subsequently stirred for 4 hours at room temperature. Precipitated potassium chloride is filtered off and the filtrate evaporated in a water jet vacuum. The residual oil is stirred with a small amount of methanol until it crystallises. Recrystallisation from 160 ml of methanol yields 23.5 g of O,-O-dimethyl-S-[-6-bromo-oxazolo[4,5-b]pyridin-2-(3H)-onyl-(3)-methyl]-dithiophosphate (m.p. 86°–87°C).

| | | | |
|---|---|---|---|
| Calc. | N 7,27 | S 16,64 | P 8,05 % |
| Found | 7,3 | 16,4 | 7,9 % |

EXAMPLE 12

Fifty-six Grams of the potassium salt of di-isopropyl-dithiophosphoric acid and 53 g of 3-chloromethyl-6-bromo-oxazolo[4,5-b]pyridine-2(3H)-one are stirred in 300 ml of acetone for 4 hours at 35°C. The acetone is distilled off a water jet vacuum, the residue treated with 300 ml of water, and the oil that has separated out taken up in ether. The ethereal solution is washed with sodium bicarbonate solution, dried and the ether distilled off. The residual oil is dissolved in 120 ml of methanol. Sixty-two Grams of O,O-diisopropyl-S-[6-bromo-oxazolo[4,5-b]pyridine-2-(3H)-onyl-(3)-methyl]-dithiophosphate (m.p. 65°–67°C) crystallise on cooling.

| | | | | | |
|---|---|---|---|---|---|
| Calc. | C 35,37 | H 4,11 | N 6,35 | P 7,03 | S 14,53 % |
| Found | 35,35 | 3,95 | 6,31 | 7,02 | 14,56 % |
| Calc. | Br 18,28 % | | | | |
| Found | 19,06 % | | | | |

By using 55 g of the potassium salt of O,O-diallyldithiophosphoric acid and proceeding in a manner analogous to the above Example, 42 g of O,O-diallyl-S-[6-bromo-oxazolo[4,5-b]pyridin-2(3H)-onyl-(3)-methyl]-dithiophosphate are obtained (m.p. 38°–40°C).

| | | | | | |
|---|---|---|---|---|---|
| Calc. | C 35,71 | H 3,22 | N 6,41 | P 7,10 | S 14,66 % |
| Found | 35,35 | 3,16 | 6,56 | 6,85 | 14,31 % |
| Calc. | Br 18,28 % | | | | |
| Found | 19,06 % | | | | |

EXAMPLE 13 a. One hundred and fifty-two Grams of oxazolo 4,5-b pyridine-2(3H)-thione [T. Takahashi and F. Yoneda, Pharm. Bull. (Tokyo) 5, 350 (1957)] in a mixture of 140 g of a 37% aqueous formaldehyde solution and 600 ml of water are stirred for ½ hour at room temperature and subsequently for 2 hours at 60°C. After cooling, filtration and drying the filtrate, 180 g of 3-hydroxymethyl-oxazolo[4,5-b]pyridin-2(3H)-thione are obtained (no real melting point; splitting off of formaldehyde at 110°C).

b. 180 g of 3-hydroxymethyl-oxazolo[4,5-b]pyridin-2(3H)-thione are suspended in 1500 ml of chloroform. 167 Grams of thionyl chloride are run in at room temperature, the mixture is stirred for half an hour at the same temperature then gradually heated to 60°C and maintained at this temperature for 2 hours. The by now clear solution is evaporated to dryness, the residue stirred with petroleum ether and filtered, yielding 190 g of crude 3-chloromethyl-oxazolo[4,5-b]pyridin2(3H)-thione (m.p. 120°–123°C).

c. 95 Grams of the potassium salt of O,O-diethyldithiophosphoric acid and 70 g of 3-chloro-methyl-oxazolo 4,5-b pyridine-2(3H)-thione are suspended in 800 ml of acetone. The suspension is stirred for 4 hours at 35° – 40°C, then the acetone is distilled off in a water jet vacuum and the residue treated with 800 ml of water. The oil that has initially separated out congeals to crystalline form. Recrystallization from 400 ml of methanol yields 87 g of O,O-diethyl-S-[oxazolo[4,5-b]pyridin- 2(3H)-thione-3-yl-methyl]-dithiophosphate (m.p. 64° - 66°C).

| Calc. | C 37,70 | H 4,32 | N 7,99 | P 8,85 | S 27,45 % |
|---|---|---|---|---|---|
| Found | 37,43 | 4,18 | 7,91 | 8,59 | 27,78 % |

EXAMPLE 14

Thirty Grams of O-methyl-dithio-methyl-phosphonic acid are dissolved in 150 ml of acetone and treated dropwise with a solution of 9 g of sodium hydroxide (solid) in 50 ml of water. 44 Grams of 3-chloromethyl-6-chloro-oxazolo[4,5-b]pyridine-2(3H)-one are introduced into the mixture, which is stirred for 4 hours at 35°C. 200 Millilitres of water are then added and the acetone is removed from the reaction mixture in a water jet vacuum. The oil that separates out initially solidifes to a viscous mass, which is isolated by decanting and recrystallised directly from 400 ml of methanol, to yield 46 g of O-methyl-S-[6-chloro-oxazolo-[4,5-b]pyridin-2(3H)-onyl-(3)-methyl]-dithio-methyl-phosphonate (m.p. 77°-79°C).

| Calc. | C 33,28 | H 3,10 | N 8,63 | P 9,56 | S 19,74 | Cl 10,92 |
|---|---|---|---|---|---|---|
| Found | 33,56 | 2,99 | 8,51 | 9,54 | 19,47 | 11,00 |

EXAMPLE 15

Twenty-two Grams of 3-chloromethyl-6-chloro-oxazolo[4,5-b]pyridine-2(3H)-one and 19 g of O-methyl-N,N-dimethyl-dithiophosphoric acid amide are dissolved in 150 ml of acetone. A solution of 5 g of sodium hydroxide (solid) in 25 ml of water is then added dropwise and the mixture is stirred for 4 hours at 40°C. The bulk of the solvent is subsequently distilled off in a water jet vacuum and the residue treated with 100 ml of water. The oil that has separated out is crystallised at once. Recrystallisation from methanol yields 25 g of O-methyl-N,N-dimethyl-S-[6-chloro-oxazolo[4,5-b]-pyridin-2(3H)-onyl-(3)-methyl]-dithiophosphoric amidate (m.p. 89°-91°C).

| Calc. | C 33,95 | H 3,70 | N 11,89 | P 8,77 | S 18,77 | Cl 10,02 % |
|---|---|---|---|---|---|---|
| Found | 34,20 | 3,75 | 12,19 | 8,66 | 18,06 | 10,18 % |

EXAMPLE 16 a. Two hundred and seventy-two Grams of oxazolo[-4,5-b]pyridine-2-(3H)-one are introduced at −5° to + 5°C into 800 ml of concentrated sulphuric acid. Thereafter 400 ml of fuming nitric acid are added dropwise at 0°-10°C and the mixture is left to stand for 3 to 4 days at room temperature. The reaction mixture is then poured onto 3 kg of ice, the precipitated nitration product filitered off and recrystallised from ethanol/water to yield 141 g of the pale yellow 6-nitro-oxazolo[4,5-b]pyridin-2(3H)-one (m.p.225°C accompanied by previous conversion at 200°C).

b. Ninety Grams of 6-nitro-oxazolo[4,5-b]pyridin-2(3H)-one are suspended in 550 ml of water. One hundred and ten Millilitres of an approx. 37 % aqueous formaldehyde solution are then added and the mixture is stirred for ½ hour at room temmperature and then for 2 hours at 60°C. The resulting paste is cooled, filtered and the filter cake washed with cold water. After a thorough drying in vacuo at 40°C, 102 g of pale yellow 3-hydroxymethyl-6-nitro-oxazolo[4,5-b]pyridin-2(3H)-one are obtained, which decomposes from 140°C accompanied by splitting off of formaldehyde.

c. One hundred and six Grams of 3-hydroxymethyl-6-nitro-oxazolo [4,5-b]pyridin-2(3H)-one are suspended in 750 ml of chloroform. 5 Milliliters of dimethylformamide are added and 100 g of thionyl chloride are then run in at room temperature. With gradual heating, the reaction commences accompanied by vigorous development of gas. After the reaction has subsided, the mixture is boiled for 1 hour under reflux and all volatile components are then distilled off in a rotary evaporator at 50°C. The residue forms a viscous oil or a crystalline crust. It is dissolved in 150 ml of ethyl acetate, the solution is treated with 75 ml of petroleum ether and filtered over animal charcoal. The clear filtrate is treated at 45°C with petroleum ether (approx. 150 ml) until the onset of turbidity. On cooling, 83 g of pale yellow 3-chloromethyl-6-nitro-oxazolo[4,5-b]pyridin2(3H)-one crystallise (m.p. 107°-109°C).

d. Forty-six Grams of 3-chloromethyl-6-nitro-oxazolo[4,5-b]-pyridin-2(3H)-one and 38 g of the ammonium salt of O,O-dimethyl-dithiophosphoric O,O acid are dissolved in 150 ml of acetone and the solution is stirred for 4 hours at 40°C. The solvent is then distilled off in a water jet vacuum at 40°C, the residue is treated with water and the oil that has separated out is taken up in ether. After being repeatedly shaken out with sodium bicarbonate solution and with water, the ether solution is dried and the solvent distilled off. The residual oil crystallises after a time. Recrystallisation twice from 10 times the amount of methanol yields 26 g of O,O-dimethyl-S-[,6-nitro-oxazolo[4,5-b]pyridin-2(3H)-onyl-(3)-methyl]-dithiophosphate (m.p. 61°-63°C).

| Calc. | C 30,77 | H 2,87 | N 11,96 | P 8,84 | S 18,25 % |
|---|---|---|---|---|---|
| Found | C 30,80 | H 2,84 | N 12,04 | P 8,84 | S 18,27 % |

Example 17 a. To 344 g of vinyl acetate are added initially 5.6 g of mercury acetate and then 0.75 g of sulphuric acid monohydrate, 65-5 Grams of oxazolo[4,5-b]pyridine-2-(3H)-one are then introduced and the mixture is heated for 7 hours under reflux. The mixture is then cooled, filtered until clear and concentrated in a rotary evaporator. The oily residue is treated with ice, then crystallised. Recrystallisation from aqueous methanol yields 54 g of 3-vinyl-oxazolo[4,5-b]pyridin-2(3H)-one (m.p. 55°-57°C).

b. Thirty-two Grams of 3-vinyl-oxazolo[4,5-b]pyridin-2(3H)-one and 45 g of diethyl-dithiophosphoric acid are disolved in 150 ml of toluene and boiled under reflux for 8 hours. The reaction mixture is then cooled, diluted with ether and shaken out with sodium bicarbonate solution and with water. The ethertoluene solution is dried and the solvent is distilled off. The residual oil crystallises slowly. Recrystallisation from 70 ml of methanol yields 37 g of O,O-diethyl-S-[oxazolo[4,5-b]pyridin2(3H)-onyl-(3)-ethyl-(1′)]-dithiophosphate (m.p. 39°–41°C).

| Calc. | C 41,37 | H 4,91 | N 8,04 | P 8,91 | S 18,41 % |
|---|---|---|---|---|---|
| Found | 41,68 | 5,08 | 8,17 | 8,90 | 18,68 % |

Example 18 a. To a solution of 32.4 g of 3-vinyl-oxazolo[4,5-b]pyridin-2(3H)-one in 200 ml of carbon tetrachloride are added slowly dropwise while cooling with ice at 0°–10°C 32 g of bromine dissolved in 100 ml of carbon tetrachloride. The reaction solution is filtered until clear and evaporated in a rotary evaporator. The residual oil crystallises on cooling. The crystallised product is triturated with 120 ml of petroleum ether and filtered, to yield 57 g of 3-(1′,2′-dibromo-ethyl)-oxazolo[4,5-b]pyridin-2(3H)-one(m.p. 70°–72°C).

| Calc. | C 29,8 | H 1,85 | Br 49,7 | N 8,7 | O 9,95 % |
|---|---|---|---|---|---|
| Found | 30,0 | 1,9 | 49,5 | 8,8 | 10,0 % | b. 64 Grams of 3-(1′,2′-dibromo-ethyl)-oxazolo[4,5-b]pyridin-2(3H)-one and 37 g of the ammonium salt of O,O-dimethyl-dithiophosphoric acid are dissolved in 250 ml of acetonitrile and stirred for 3 hours at 60°C. The bulk of the solvent is then distilled off in a water jet vacuum and the residue is treated with 200 ml of water. The oil that has separated out is taken up in ether, the ether solution is washed with sodium distilled off. The residue crystallises. Recrystallisation from 55 ml of methanol yields 30 g of O,O-dimethyl-S-[oxazolo-[4,5-b]pyridin-2(3H)-onyl-(3)-(2′-bromo-ethyl)-(1′)]-dithiophosphate (m.p. 78°–80°C).

| Calc. | C 30,08 | H 3,03 | N 7,02 | P 7,76 | S 16,06 | Br 20,02 % |
|---|---|---|---|---|---|---|
| Found | 30,19 | 3,03 | 7,06 | 7,84 | 16,00 | 20,12 % |

Example 19 a. As in Example 16, 344 g of vinyl acetate, 5.6 g of mercury acetate, 0.75 g of sulphuric acid monohydrate and 85.3 g of 6-chloro-oxazolo[4,5-b]pyridine-2-(3H)-one are mixed together and the reaction mixture is stirred for 12 hours at 50°C. The mixture is then filtered until clear and the filtrate evaporated to dryness in a rotary evaporator. The residue is suspended with cold water and filtered. Ninety-five Grams of crude product are obtained (m.p. 102°–104°C). Recrystallisation from methanol yields 88 g of 3-vinyl-6-chloro-oxazolo[4,5-b]pyridin-2-(3H)-one (m.p. 104°C).

| Calc. | C 48,9 | H 2,54 | N 14,27 | O 16,3 | Cl 18,1 % |
|---|---|---|---|---|---|
| Found | 48,6 | 2,7 | 14,1 | 16,8 | 18,0 % | b. Thirty-nine Grams of 3-vinyl-6-chloro-oxazolo[4,5-b]pyridin-2(3H)-one and 45 g of O,O-diethyl-dithiophosphoric acid are dissolved in 150 ml of toluene and boiled under reflux for 8 hours. The reaction mixture is cooled, diluted with ether, shaken out with sodium bicarbonate solution and with water, dried, and the solvent distilled off. The residual oil crystallises. Recrystallisation from 100 ml of methanol yields 61 g of O,O-diethyl-S-[6-chloro-oxazolo[4,5-b]pyridin-2(3H)-onyl-(3)-ethyl-(1′)]-dithiophosphate (m.p. 45°–47°C).

| Calc. | C 37,65 | H 4,22 | N 7,31 | P 8,10 | S 16,75 | Cl 9,26 |
|---|---|---|---|---|---|---|
| | 37,39 | 4,28 | 7,41 | 8,43 | 16,79 | 9,44 |

Example 20 a. To a solution of 98 g of 3-vinyl-t-chloro-oxazolo[4,5-b]pyridin-2(3H)-one and 0.2 g of hydroquinone in 800 ml of carbon tetrachloride are slowly added dropwise while cooling with ice at 0°–10°C 80 g of bromine dissolved in 200 ml of carbon tetrachloride. The reaction mixture is filtered until clear and evaporated in a rotary evaporator. The crystalline residue is triturated with 300 ml of petroleum ether and filtered to yield 161 g of 3-(1′,2′-dibromoethyl)-6-chloro-oxazolo[4,5-b]pyridin -2(3H)-one (m.p. 71°–73°C).

| Calc. | C 26,9 | H 1,4 | Br 44,9 | Cl 9,9 | N 7,8 % |
|---|---|---|---|---|---|
| Found | C 26,1 | H 1,4 | Br 44,5 | Cl 10,1 | N 8,5 % | b. 71 Grams of 3-(1′,2′-dibromoethyl)-6-chloro-oxazolo[4,5-b]pyridin-2(3H)-one and 48 g of the potassium salt of O,O-diethyl-dithiophosphoric acid are dissolved in 250 ml of acetonitrile and the solution is stirred for 4 hours. The bulk of the solvent is then distilled off in a water jet vacuum and the residue is treated with 300 ml of water. The oil that has separated out is taken up in ether, the ether solution is washed with sodium bicarbonate solution and with water, dried, and the ether distilled off. 86 Grams of a pale yellow, non-distillable oil are obtained, which consists largely of O,O-diethyl-S-[6-chloro-oxazolo[4,5-b]pyridin-2(3H)-onyl-(3)-(2′-bromoethyl)-(1′)]-dithiophosphate

| Calc. | C 31,2 | H 3,3 | Br 17,3 | Cl 7,7 | N 6,1 | P 6,7 | S 13,9 % |
|---|---|---|---|---|---|---|---|
| Found | C 31,9 | H 3,4 | Br 16,3 | Cl 7,7 | N 6,1 | P 6,7 | S 14,2 % |

Example 21 a. Proceeding in a manner analogous to that described in Example 17, 700 g of vinyl acetate, 1 ml of sulphuric acid monohydrate and 214 g of 6-bromo-oxazolo[4,5-b]-pyridine-2(3H)-one are reacted under reflux. The reaction mixture is then filtered hot until clear and the filtrate evaporated to dryness in vacuo. The residue is suspended in water and filtered. One hundred and ninety Grams of crude product are obtained. Recrystallisation from 1100 ml of ethanol yields 147 g of 3-vinyl-6-bromo-oxazolo[4,5-b]pyridin-2(3H-one (m.p. 110°–112°C).

vinyl-6-nitro-oxazolo[4,5-b]pyridin-2(3H)-one. (m.p. 107°–109°C).

b. Thirty-eight Grams of O,O-dimethyl-dithiophosphoric acid and 41 g of 3-vinyl-6-nitro-oxazolo[4,5-b]pyridin-2(3H)-one are reacted as in Example 21(b). Recrystallisation twice from 150 ml of methanol yields 19 g of O,O-dimethyl-S-[6-nitor-oxazolo[4,5-b]pyridin-2(3H)-onyl-(3)-ethyl-(1′)]-dithiophosphate (m.p. 107°–110°C; mixed melting point with starting material 77°–80°C).

| | | | | |
|---|---|---|---|---|
| Calc. | C 32,87 | H 3,31 | N 11,50 | P 8,50 | S 17,56 % |
| Found | C 33,00 | H 3,45 | N 11,51 | P 8,18 | S 17,47 % |

| | | | | |
|---|---|---|---|---|
| Calc. | C 39,85 | H 2,08 | Br 33,2 | N 11,6 % |
| Found | C 40,2 | H 2,1 | Br 32,8 | N 11,6 % | b. Thirty-eight Grams of O,O-dimethyl-dithiophosphoric acid and 48 g of vinyl-6-bromo-oxazolo[4,5-b]pyridin-2(3H)-one are dissolved in 120 ml of anydrous benzene and boiled under reflux for 8 hours. The reaction mixture is cooled, diluted with ether and shaken out with sodium bicarbonate solution. The product is crystallised from the ether solution, filtered and recrystallised from 900 ml of methanol to yield 56 g of O,O-dimethyl-S-[6-bromo-oxazolo[4,5-b]pyridin-2(3H)-onyl(3)-ethyl-(1′)]-dithiophosphate (m.p. 115°–117°C).

| Compounds | melting point |
|---|---|
| O,O-diethyl-S-[oxazolo[4,5-b]pyridin-2(3H)-onyl-(3)-methyl]-thiophosphate | 38 – 39° |
| O,O-di-isopropyl-S-[oxazolo[4,5-b]pyridin-2-(3H)-onyl-(3)-methyl]-dithio-phosphate | 61 – 63° |
| O,O-diallyl-S-[oxazolo[4,5-b]pyridin-2(3H)-onyl-(3)-methyl]-dithiophosphate | 48 – 50° |
| O,O-bis-(2′chloroethyl)-S-[oxazolo[4,5-b]-pyridin-2(3H)-onyl-(3)-methyl]-dithiophosphate | 68 – 70° |
| O-methyl-S-[oxazolo[4,5-b]pyridin-2(3H)-onyl-(3)-methyl]-dithio-phenyl-phosphonate | 95 – 97° |
| O,O-di-isopropyl-S-[6-chloro-oxazolo[4,5-b]-pyridin-2(3H)-onyl-(3)-methyl]-dithiophosphate | 43 – 45° |
| O,O-bis-(2′-methoxy-ethyl)-S-[6-chloro-oxazolo-[4,5-b]pyridin-2(3H)-onyl-(3)-methyl]-dithiophosphate | non-distillable oil |
| O,O-diallyl-S-[6-chloro-oxazolo[4,5-b]pyridin-2(3H)-onyl-(3)-methyl]-dithiophosphate | 28 – 29° |
| O-ethyl-S-[6-chloro-oxazolo[4,5-b]pyridin-2-(3H)-onyl-(3)-methyl]-dithiophenylphosphonate | 66 – 68° |
| O,O-diethyl-S-[6-bromo-oxazolo[4,5-b]pyridin-2-(3H)-onyl-(3)-methyl]-thiophosphate | 58 – 60° |
| O,O-bis(2′-methoxy-ethyl)-S-[6-bromo-oxazolo-[4,5-b]pyridin-2(3H)-onyl-(3)-methyl]-dithiophosphate | non-distillable oil |
| O,O-bis-(2′chloro-ethyl)-S-[6-bromo-oxazolo-[4,5-b]pyridin-2(3H)-onyl-(3)-methyl]-dithiophosphate | 88 – 91° |
| O,O-dimethyl-S-[oxazolo[4,5-b]pyridin-2(3H)-thione-3-yl-methyl]-dithiophosphate | 83 – 85° |
| O-ethyl-S-[6-chloro-oxazolo[4,5-b]pyridin-2-(3H)-onyl-(3)-methyl]-dithio-methylphosphate | 56 – 58° |

| | | | | | |
|---|---|---|---|---|---|
| Calc. | C 30,08 | H 3,03 | N 7,01 | P 7,77 | S 16,06 | Br 20,02 % |
| Found | C 30,18 | H 3,01 | N 7,01 | P 7,55 | S 16,17 | Br 20,21 % |

Example 22 a. To 240 g of vinyl acetate are added successively 03.6 g of mercury acetate, 0.45 g of sulphuric acid monohydrate and 54 g of 6-nitro-oxazolo[4,5-b]pyridin-2(3H)-one. The mixture is stirred for 2 hours at 50°C and the by now clear solution is concentrated in a rotary evaporator. The crystalline residue is stirred with cold water, filtered, and the filtrate crystallised from 250 ml of ethanol to yield 41 g of pale yellow 3-

| | | | | | | |
|---|---|---|---|---|---|---|
| +Calc. | C 36,40 | H 4,23 | N 6,53 | P 7,23 | S 14,95 | Cl 8,27 % |
| ++Found | 36,9 | 4,3 | 6,8 | 6,8 | 14,5 | 9,1 % |
| ++Calc. | C 32,99 | H 3,84 | N 5,91 | P 6,65 | S 13,55 | Br 16,88 % |
| Found | C 33,1 | H 3,8 | N 5,9 | P 6,2 | S 13,0 | Br 17,5 % |

| Compounds | melting point |
|---|---|
| O,O-dimethyl-S-[oxazolo[4,5-b]pyridin-2(3H)-onyl-(3)-methyl]-thiophoshate | 77° – 79° |
| O,O-dimethyl-S-[6-bromo-oxazolo[4,5-b]pyridin-2(3H)-onyl-(3)-methyl]-thiophosphate | 96° – 101° |
| O,O-diethyl-S-[6-bromo-oxazolo[4,5-b]pyridin-2(3H)-onyl-(3)-methyl]-dithiophosphate | 83° – 85° |
| O-methyl-N,N-dimethyl-S-[oxazolo[4,5-b]pyridin-2(3H)-onyl-(3)-methyl]-dithiophosphorus amidate | 44° – 46° |
| O-ethyl-N,N-dimethyl-S-[6-chloro-oxazolo[4,5-b]pyridin-2(3H)-onyl-(3)-methyl]-dithiophosphorus amidate | non-distill-able oil +++ |
| O,O-dimethyl-S-[oxazolo[4,5-b]pyridin-2(3H)-onyl-(3)-ethyl-(1′)]-dithiophosphate | non-distill-able oil ++++ |
| O,O-dimethyl-S-[6-chloro-oxazolo[4,5-b]pyridin-2(3H)-onyl-(3)-ethyl-(1′)]-dithiophosphate | 103° – 105° |
| O,O-diethyl-S-[6-bromo-oxazolo[4,5-b]pyridin-2(3H)-onyl-(3)-ethyl-(1′)]-dithiophosphate | 68° – 70° |
| O,O-diethyl-S-[oxazolo[4,5-b]pyridin-2(3H)-onyl-(3)-(2′-bromo-ethyl)-(1′)]-dithiophosphate | 30° – 32° |
| O,O-diethyl-S-[6-nitro-oxazolo[4,5-b]pyridin-2(3H)-onyl-(3)-ethyl-(1′)]-dithiophosphate | 103° – 105° |

| | | | | | | |
|---|---|---|---|---|---|---|
| +++Calc. | C 35,92 | H 4,11 | N 11,43 | P 8,44 | S 17,44 | Cl 9,64 % |
| Found | C 36,2 | H 4,1 | N 11,5 | P 7,9 | S 16,9 | Cl 10,0 % |
| ++++Calc. | C 37,49 | H 4,09 | N 8,75 | P 9,69 | S 20,02 % | |
| Found | C 37,6 | H 4,1 | N 8,5 | P 9,6 | S 20,4 % | |

| Compounds | melting point |
|---|---|
| O-methyl-S-(oxazolo(4,5-b)pyridin-2(3H)-one-3-yl-methyl)-dithio-methylphosphonate | 74 – 76° |
| O-ethyl-S-(oxazolo(4,5-b)pyridin-2(3H)-one-3-yl-methyl)-dithio-methylphosphonate | non-distillable oil+++++ |
| O-methyl-S-(6-chloro-oxazolo(4,5-b)-pyridin-2(3H)-one-3-yl-methyl)-dithio-ethylphosphonate | 55 – 56° |
| O,O-dimethyl-S-(oxazolo(4,5-b)pyridin-2(3H)-one-3-yl-(2'chloroethyl)-(1'))-dithiophosphate | 66 – 68° |
| O,O-dimethyl-S(6-chloro-oxazolo(4,5-b)-phyridin-2(3H)-one-3-yl-(2'-bromoethyl)-(1'))-dithiophosphate | non-distillable oil ++++++ |
| O,O-dimethyl-S-(6-bromo-oxazolo(4,5-b)pyridin-2(3H)-one-3-yl-(2'-bromoethyl)-(1'))-dithiophosphate | non-distillable oil +++++++ |

| | | | | | | | |
|---|---|---|---|---|---|---|---|
| +++++Calc.: | C 39,47 | H 4,31 | N 9,21 | P 10,18 | S 21,08 % | | |
| Found: | 39,5 | 4,6 | 8,8 | 10,3 | 20,8 % | | |
| ++++++Calc.: | C 27,69 | H 2,56 | N 6,47 | P 7,16 | Cl 8,18 | Br 18,43 % | |
| Found: | 28,2 | 2,6 | 6,5 | 7,1 | 7,9 | 18,8 % | |
| +++++++Calc.: | C 25,12 | H 2,32 | N 5,86 | P 6,49 | S 13,41 | Br 33,44 % | |
| Found: | 25,9 | 2,5 | 5,6 | 6,1 | 12,8 | 33,3 % | |

Example 23

Five hundred and forty-eight Grams of 3-chloromethyl-6-chloro-oxazolo[4,5-b]pyridine-2(3H)-one, 480 g of the ammonium salt of O,O-dimethylmonophosphoric acid and 1200 ml of methanol are heated to the boil as quickly as possible while stirring thoroughly and refluxed for 5 minutes. The mixture is poured into 1800 ml of water and the bulk of the methanol is distilled off in a rotary evaporator. The initially oily precipitate congeals in the process to a crystalline state, is isolated by filtration and recrystallised from a mixture of 1200 ml of methanol and 300 ml of water, to yield 497 g of O,O-dimethyl-S-(6-chloro-oxazolo (4,5-b)-pyridin-2(3H)-one-3-yl-methyl)-thiophosphate (m.p. 89°–90°C).

| Calc.: | C 33,29 | H 3,11 | N 8,63 | P 9,56 | S 9,88 | Cl 10,92 % |
|---|---|---|---|---|---|---|
| Found: | 33,56 | 3,13 | 8,52 | 9,62 | 9,78 | 11,05 % |

Example 24

Thirty-two Grams of 3-(1',2'-dibromoethyl)-oxazolo(4,5-b)pyridine-2(3H)-one are introduced into a solution of 19 g of the ammonium salt of O,O-dimethyl-dithiophosphoric acid in 50 ml of water. The mixture is stirred for ½ hour at 60°–70°C so vigorously that the fused dibromo compound is well emulsified. The oil layer congeals to a crystalline state on cooling and afterr recrystallisation yields 26 g of O,O-dimethyl-S-(oxazolo (4,5-b)-pyridin-2-(3H)-one-3-yl-(2'-bromoethyl)-(1'))dithiophosphate (m.p. 70°–80°C), which is identical with the compound of Example 18 b.

Example 25

Twenty-two Grams of 3 -chloromethyl-6-chloro-oxazolo[4,5-b]pyridine-2(3H)-one and 20 g of the sodium salt of O-ethyl-thiophosphoric acid containing water of crystallisation are refluxed for 10 minutes in 50 ml of methanol. The solvent is distilled off in a rotary evaporator and on treating the residue with 100 ml of water a crystalline filling is obtained. Recrystallisation from 200 ml of aqueous methanol yields 17 g of O-ethyl-S-(6-chloro-oxazolo(4,5-b)pyridin-2(3H)-one-3-yl-methyl)-thiophosphoric amidate (m.p. from 110°C with decomp.).

| Calc.: | C 33,39 | H 3,43 | N 12,98 | P 9,59 | S 9,91 | Cl 10,95 % |
|---|---|---|---|---|---|---|
| Found: | 33,72 | 3,55 | 12,91 | 9,37 | 9,89 | 11,07 % |

Example 26 a. Proceeding in a manner analogous to that described in Examples 18a and 20a, 3-(1',2'-dibromoethyl)-6-bromooxazolo(4,5-b)pyridin-2(3H)-one is manufactured from 3-vinyl-6-bromo-oxazolo[4,5-b]pyridin-2(3H)-one (m.p. 84°–86°C).

| Calc.: | C 23,95 | H 1,25 | Br 60,0 | N 7,0 % |
|---|---|---|---|---|
| Found: | 24,1 | 1,2 | 59,6 | 7,1 % | b. Forty Grams of 3-(1',2'-dibromoethyl)-6-bromo-oxazolo(4,5-b)pyridin-2(3H)-one and 24 g of the potassium salt of O,O-diethyl-dithiophosphoric acid are suspended in 50 ml of methanol and refluxed for 10 minutes. The solvent is then distilled off in a rotary evaporator and the residue is treated with 100 ml of water. The viscous oil that has separated out is taken up in ether, the ether solution washed with sodium bicarbonate solution and water, dried, and the ether distilled off. Fifty-one Grams of O,O-diethyl-S-(6-bromo-oxazolo(4,5-b)pyridin-2(3H)-one-3-yl-(2'-bromoethyl)-(1'))-dithiophosphate are obtained in the form of a pale yellow, viscous, non-distillable oil.

| Calc.: | C 28,47 | H 2,98 | N 5,54 | P 6,13 | S 12,67 | Br 31,59 % |
|---|---|---|---|---|---|---|
| Found: | 29,1 | 3,1 | 5,6 | 6,0 | 12,4 | 31,1 % |

Example 27 a. Chlorine gas is introduced while cooling with ice at 0°–10°C into a solution of 243 g of 3-vinyl-oxazolo[4,5-b]pyridin-2(3H)-one and 0.6 g of hydroquinone in 1500 ml of carbon tetrachloride. The reaction solution is then filtered clear and concentrated in a rotary evaporator. The initially oily residue is stirred with petroleum ether until it has thoroughly crystallised. The crystalline product is then filtered off and 220 g of 3-(1',2'-dichloroethyl)-oxazolo[4,5-b]pyridin-2-(3H)-one are obtained (m.p. 58°–62°C).

| | | | | |
|---|---|---|---|---|
| Calc.: | C 41,2 | H 2,58 | Cl 30,47 | N 12,01 % |
| Found: | 40,9 | 2,6 | 30,4 | 12,0 % |

By proceeding analogously, the two corresponding 3-(1',2'-dichloroethyl) derivatives are obtained from 3-vinyl-6-chloro-oxazolo[4,5-b]pyridin-2(3H)-one and 3-vinyl-6-bromooxazolo[4,5-b]pyridin-2(3H)-one; m.p. 60°–64°C and 73°–75° respectively.

| | | | | | |
|---|---|---|---|---|---|
| Calc.: | C 30,8 | H 1,6 | Br 25,6 | Cl 22,8 | N 8,98 % |
| Found: | 31,6 | 1,7 | 25,8 | 21,0 | 9,1 % | b. Twelve Grams of 3-(1',2'-dichloroethyl)-oxazolo(4,5-b)pyridin-2(3H)-one are dissolved in 40 ml of methanol by gentle heating. Thirteen Grams of the potassium salt of O,O-diethyldithiophosphoric acid are dissolved in a mixture of 10 ml of water and 20 ml of methanol. The two solutions are combined and left to stand for 24 hours at room temperature, in the process of which an oily and a crystalline precipitate occur. The mixture is then heated briefly to 60°C, the bulk of the methanol is evaporated off in a rotary evaporator, the residue is treated with water and extracted with ether. Recrystallisation from 30 ml of methanol yields 13 g O,O-diethyl-S-(oxazolo(4,5-b)pyridin-2(3H)-one-3-yl-(2'-chloroethyl)-1(1'))-dithiophosphate (m.p. 47°–48°C).

| | | | | | | |
|---|---|---|---|---|---|---|
| Calc.: | C 37,64 | H 4,21 | N 7,32 | P 8,11 | S 16,75 | Cl 9,26 |
| Found: | 37,48 | 4,37 | 7,34 | 8,07 | 16,71 | 9,50 |

If the same reaction takes place in acetonitrile instead of in aqueous methanol over 4 hours at 60°C, the same product is obtained in poorer yield and purity (m.p. 45°–47°C).

Example 28

By proceeding in a manner analogous to that described in Example 14, 38 g of O-ethyl-dithio-ethylphosphoric acid are reacted with 44 g of 3-chloromethyl-6-chloro-oxazolo[4,5-b]pyridine-2(3H)-one. Thirty-six Grams of O-ethyl-S-(6-chloro-oxazolo[4,5-b]pyridin-2(3H)-one-3-yl-methyl)-dithioethylphosphonate are obtained (m.p. 40°–42°C).

| | | | | | | |
|---|---|---|---|---|---|---|
| Calc.: | C 37,44 | H 4,00 | Cl 10,65 | N 7,94 | S 10,18 | P 8,77 % |
| Found: | 37,28 | 4,15 | 10,22 | 8,04 | 17,96 | 8,66 % |

Example 29

Determination of the anthelminthic action in hens infected with Ascaridia galli

One to 3 days old chicks are artificially infected with eggs of Ascaridia galli (roundworms). Groups of chicks each were used per test. Four to 5 weeks after the chicks had been infected, the active substances were administered in one dose per day on three successive days. Infected chicks that were not treated were used for control purposes.

Evaluation

The number of Ascaridia gallia rejected per test group over the course of 5 days after the first adminitration of active substance was determined daily and the number still found in the intestine of the 5th. day was likewise determined on dissection. Furthermore, the number of chicks free from worms was determined.

| Active substance | Daily dosage in mg per kg body weight | Number of ascaridia of 5 chicks | | | Number of worm-free chicks |
|---|---|---|---|---|---|
| | | rejected during period of test | | found on dissection | |
| | | absolute number | in % of total number | | |
| O,O-di-isopropyl-S-[oxazolo[4,5-b]-pyridin-2(3H)-onyl-(3)-methyl]-dithiophosphate | 750 | 68 | 100 | 0 | 5 |
| O,O-bis-(2'-chloroethyl)-S-[oxazolo [4,5-b]pyridin-2(3H)-onyl-(3)-methyl]-dithiophosphate | 750 | 56 | 100 | 0 | 5 |
| O,O-diethyl-S-[6-chloro-oxazolo-[4,5-b] pyridin-2(3H)-onyl-(3)-methyl]-dithiophosphate | 750 | 75 | 100 | 0 | 5 |
| O,O-diethyl-S-[6-bromo-oxazolo-[4,5-b]-pyridin-2(3H)-onyl-(3)-methyl]-dithiophosphate | 750 | 82 | 100 | 0 | 5 |

Example 30

Tests on mice infected with Syphacia obvel. and Nematospiroides dubius

Five mice each infected simultaneously with oxyurae (Syphacia obvel.) and trichostongylidae (Nematospiroides dubuis) were freely fed with feed meal containing 0.2% of active substance. The mice were dissected on the 6th. day of the test and the number of worms present in the intestine was counted. Untreated mice that were simultaneously infected in the same way were used for control purposes.

Example 31 a. Insecticidal contact poison action $a_1$. For the test on polyvalent resistant house flies, mosquitoes (Aedes aegypti) and stable flies (Stomoxys calcitrans), coatings of active substance from acetonic active solutions in Petri dishes are applied in the following concentrations:

a. 10 mg active substance/dish (for Musca)
b. 1 mg active substance/dish (for Aedes)
c. 1 g active substance/m$^2$ (for Stomoxys)

After 1 hour the dishes are filled with the test subjects. The following table indicates the time after which all subjects are on their backs.

| Active substance | Daily dosage in mg/kg | Total dosage in mg/kg | Infection of test animals on dissection | Infection of the control animals on dissection |
|---|---|---|---|---|
| O,O-diethyl-S-[oxazolo[4,5-b]-pyridin-2(3H)-onyl-(3)-methyl]-dithiophosphate | 208 | 1248 | Syphacia obvel. 0-0-0-0-0<br>Nematospir. dub. 0-0-0-0-0 | Syphacia obvel.<br>Nematospir. dub. 6-8-8-10 |
| O,O-diethyl-S-[oxazolo[4,5-b]-pyridin-2(3H)-thione-3-yl-methyl]-dithiophosphate | 175 | 1050 | Syphacia obvel. 0-0-0-0-0<br>Nematospir. dub. 0-0-0-0-0 | Syphacia obvel. 1-1-2-4<br>Nematospir. dub. 6-8-8-10 |

| Active substance | Flies | Mosquitoes | Stable flies |
|---|---|---|---|
| O,O-dimethyl-S-(oxazolo(4,5-b))-pyridin-2(3H)-one-2-yl-methyl)-dithiophosphate | 24" | 60' | 10' |
| O,O-dimethyl-S-(oxazolo(4,5-b))-pyridin-2(3H)-one-3-yl-ether(1'))-dithiophosphate | 2" | 60' | 30' |
| O,O-diethyl-S-(oxazolo(4,5-b)-pyridin-2(3H)-one-3-yl-ethyl-1'))-dithiophosphate | 2" | 60' | 30' |
| O,O-diethyl-S-(oxazolo(4,5-b))-pyridin-2(3H)-one-3-yl-(2'-bromo-ethyl)-(1'))-dithiophosphate | 5" | 2" | 2" |
| O,O-dimethyl-S-(oxazolo(4,5-b))-2(3H)-one-3-yl-methyl)-thiophosphate | 60" | 20' | 10' |
| O,O-diethyl-S-(oxazolo(4,5-b))-pyridin-2(3H)-one-3-yl-methyl)-thiophosphate | 5" | 90' | 30' |
| O,O-dimethyl-S-(6-chloro-(oxazolo(4,5-b))-2(3H)-one-3-yl-methyl)-dithiophosphate | 24" | 8" | 30' |
| O,O-dimethyl-S-(6-chloro-(oxazolo-(4,5-b))-pyridin-2(3H)-one yl-ethyl-(1'))-dithiophospate | 24" | 5" | 90' |
| O,O-dimethyl-S-(6-chloro-(oxazolo-(4,5-b))-pyridin-2(3H)-one-3-yl-methyl)-thiophosphate | 60' | 45' | 10' |
| O,O-diethyl-S(6-chlor-(oxazolo(4,5-b))-pyridin-2(3H)-one-3-yl-methyl)-thiophosphate | 60' | 5' | 60' |
| O,O-diisopropyl-S-(6-chloro-(oxazolo-(4,5-b))-pyridin-2(3H)-one-3-yl-methyl)-dithiophosphate | 2" | — | 60' |
| O-ethyl-S(6-chloro-(oxazolo(4,5-b))-pyridin-2(3H)-one-3-al-methyl)-dithiomethylphosphonate | 5" | 2" | 60' |
| O,O-dimethyl-S(6-bromo(oxazolo(4,5-b))-pyridin-2(3H)-one-3-yl-methyl)-dithiophosphate | 5" | 5" | 10' |
| O,O-dimethyl-S-(6-bromo-(oxazolo(4,5-b))-pyridin-2(3H)-one-3-yl-methyl)-thiophosphate | 2" | 2" | 30' |
| O,O-diethyl-S-(6-bromo(oxazolo-(4,5-b))-pyriding-2(3H)-one-3-yl-methyl)-thiophosphate | 2" | 5" | 90' | a₂. 20 mg of a 1% dusting agent are uniformly distributed in Petri dishes. The dishes are then filled with cockroaches (Phyllodromia germanica and Periplaneta americana) and kept under normal conditions at 22°-24°C.

The following table indicates the time after which all animals are in the dorsal position.

Insecticidal contact poison action against cockroaches:

| | |
|---|---|
| O,O-dimethyl-S(6-chloro-(oxazolo(4,5-b))pyridin-2(3H)-one-3-yl-methyl)-dithiophosphate | 4ⁿ |
| O,O-dimethyl-S(6-bromo-(oxazolo(4,5-b))-pyridin-2(3H)-one-yl-methyl)-dithiophosphate | 90' |
| O,O-dimethyl-S(oxazolo(4,5-b)-pyridin-2(3H)-one-3-yl-methyl)-thiophosphate | 55' |
| O,O-dimethyl-S-(6-chloro-(oxazolo(4,5-b))-pyridin-2(3H)-one-3-yl-methyl)-thiophosphate | 45' |
| O,O-dimethyl-S(6-bromo(oxazolo(4,5-b))-pyridin-2(3H)-one-3-yl-methyl)-thiophosphate | 50' |
| O,O-diethyl-S-(6-chloro-(oxazolo(4,5-b))-pyridin-2(3H)-one-3-yl-methyl)-thiophosphate | 47' |
| O,O-diethyl-S(6-bromo-(oxazolo(4,5-b))-pyridin-2(3H)-one-3-yl-methyl)-thiophosphate | 57' |
| O,O-dimethyl-S-(oxazolo(4,5-b))-pyridin-2(3H)-one-3-yl-ethyl(1'))-dithiophosphate | 55' |
| O,O-dimethyl-S-(oxazolo(4,5-b))-pyridin-2(3H)-on-3-yl-ethyl-(1'))-dithiophosphate | 105' |
| O,O-diethyl-S(oxazolo(4,5-b))-pyridin-2(3H)-one-3-yl-(2'bromoethyl)-(1'))-dithiophosphate | 4ⁿ |
| O,O-diethyl-S-(6-chloro-(oxazolo(4,5-b))-pyridin-2(3H)-one-3-yl-ethyl-(1'))-dithiophosphate | 5ⁿ |
| O-methyl-S-(6-chloro-(oxazolo(4,5-b))-pyridin-2(3H)-one-3-yl-methyl)-dithiomethylphosphate | 95' |
| O-ethyl-S(6-chloro-(oxazolo(4,5-b))-pyridin-2(3H)-one-3-yl-methyl)-dithiomethylphosphate | 60' | a₃. Grain weevils are sprayed with 2 ml of 1% acetonic active substance solution from a distance of 10 cm by means of a spray jet. Immediately after the application the weevils are transferred to clean Petri dishes and kept at 22°C. The following table indicates the time after which all the weevils are in the dorsal position.

Insecticidal contact poison action against grain weevils

| | |
|---|---|
| O,O-dimethyl-S-(oxazolo(4,5-b))-pyridin-2(3H)-one-3-yl-methyl)-dithiophosphate | 3ⁿ |
| O,O-dimethyl-S-(oxazolo(4,5-b))-pyridin-2(3H)-one-3-yl-methyl)-thiophosphate | 60' |
| O,O-dimethyl-S-(oxazolo(4,5-b))-pyridin-2(3H)-one-3-yl-ethyl-(1'))-dithiophosphate | 60' |
| O,O-dimethyl-S-(6-chloro-(oxazolo(4,5-b))-pyridin-2(3H)-one-3-yl-methyl)-thiophosphate | 30' |
| O,O-diethyl-S-(6-chloro-(oxazolo(4,5-b))-pyridin-2(3H)-one-3-yl-methyl)-thiophosphate | 100' |
| O-ethyl-S(6-chloro-(oxazolo(4,5-b))-pyridin-2(3H)-one-3-yl-methyl)-dithio-methylphosphonate | 2ⁿ |
| O,O-dimethyl-S-(6-bromo-(oxazolo(4,5-b))-pyridin-2(3H)-one-3-yl-methyl)-thiophosphate | 30' |
| O,O-diethyl-S-(6-bromo-(oxazolo(4,5-b))-pyridin-2(3H)-one-3-yl-methyl)-thiophosphate | 100' | b. Insecticidal period of activity a. on glass: Petri dishes with active substance coatings of 1 g of active substance per m² are left to stand for 8 days at 24°C. Then polyvalent resistant hous flies, mosquitoes and stable flies are placed on the coatings.

b. on wood: the active substances are applied to small planks of wood in a concentration of 1 g of active substance per m² from aqueous suspension. After 8 days the above mentioned test subjects are placed on the planks. The following table indicates the time in hours after which the test subjects are in the dorsal position.

| | Glass 8 days | | Wood 8 days | | |
|---|---|---|---|---|---|
| | flies | mosquitoes | flies | mosquitoes | stable flies |
| O,O-dimethyl-S-(oxazolo-(4,5-b))pyridin-2(3H)-one-3-yl-methyl)-thiophosphate | 5ⁿ | 60' | 60' | — | 90' | 90' |
| O,O-diethyl-S-(oxazolo-(4,5-b))pyridin-2(3H)-one-3-yl-methyl)-thiophosphate | 4ⁿ | 55' | — | — | 5ⁿ | 90' |
| O,O-dimethyl-S-(oxazolo-(4,5-b))pyridin-2(3H)-one-3-yl-ethyl-(1')-dithiophosphate | 5ⁿ | 30' | 30' | 5ⁿ | 90' | 60' |
| O,O-diethyl-S-(oxazolo-(4,5-b))pyridin-2-(3H)-one-3-yl-ethyl-(1'))-dithiophosphate | 5ⁿ | 30' | 10' | 5ⁿ | 60' | 30' |
| O,O-dimethyl-S-(6-chloro-(oxazolo(4,5-b))pyridin-2(3H)-one-3-yl-methyl)-dithiophosphate | — | — | — | 5ⁿ | 100' | 70' |
| O,O-dimethyl-S-(-chloro-(oxazolo(4,5-b))pyridin-2(3H)-one-3-yl-methyl)-dithiophosphate | 5ⁿ | 2ⁿ | 60' | 5ⁿ | 90' | 30' |
| O-ethyl-S(6-chloro-(oxazolo(4,5-b))pyridin-2(3H)-one-3-yl-methyl)-dithio-methylphosphonate | 5ⁿ | 2ⁿ | 30' | 2ⁿ | 60' | 60' |
| O,O-dimethyl-S-(6-bromo-(oxazolo(4,5-b))pyridin-2(3H)-one-3-yl-methyl)-thiophosphate | 5ⁿ | 5ⁿ | 60' | 5ⁿ | 90' | 60' |
| O,O-diethyl-S-(6-bromo-(oxazolo(4,5-b))pyridin-2(3H)-one-3-yl-methyl)-thiophosphate | 5ⁿ | 5ⁿ | 90' | 2ⁿ | 5ⁿ | 30' |
| O,O-diethyl-S-(oxazolo(4,5-b))-pyridin-2(3H)-one-3-yl-(2'-bromoethyl)-(1'))-dithiophosphate | 5ⁿ | 60' | 30' | — | 2ⁿ | 5ⁿ | c. Systematic insecticidal action

To determine the systematic action, 50 ml of an aqueous emulsion containing 100 ppm of active substance (obtained from a 10% emulsifiable concentrate) is poured onto the earth of bean plants in pots per 600 cm³.

After 3 days, aphids (aphis fabae) are placed on the portions of the plants above the soil. The aphids are protected by a special device from the contact and gas action. The test is carried out at 24°C and 70% relative atmospheric humidity.

The following table indicates the time in days after which 100% of the aphids are in the dorsal position.

|  | Days |
|---|---|
| O,O-dimethyl-S-(oxazolo(4,5-b))-pyridin-2(3H)-one-3-yl-ethyl-(1'))-dithiophosphate | 3 |
| O,O-diethyl-S-(oxazolo(4,5-b))-pyridin-2(3H)-one-3-yl-ethyl-(1'))-dithiophosphate | 3 |
| O,O-diethyl-S-(oxazolo(4,5-b))-pyridin-2(3H)-one-3-yl-ethyl-(1'))-dithiophosphate | 1 |
| O,O-dimethyl-S-(oxazolo(4,5-b))-pyridin-2(3H)-one-3-yl-methyl)-thiophosphate | 3 |
| O,O-diethyl-S-(oxazolo(4,5-b))-pyridin-2(3H)-one-3-yl-methyl)-thiophosphate | 1 |
| O,O-bis-(2'-methoxy-ethyl)-S-(oxazolo(4,5-b))pyridin-2(3H)-one-3-yl-methyl)-dithiophosphate | 3 |
| O-methyl-N,N-dimethyl-S-(oxazolo(4,5-b))-pyridin-2(3H)-one-3-yl-methyl)-dithio-phosphorus amidate | 2 |
| O,O-dimethyl-S-(6-bromo-(oxazolo(4,5-b))-pyridin-2(3H)-one-3-yl-methyl)-thiophosphate | 3 | d. Insecticidal ingested poison action

Potato plants are dipped in a 0.1% aqueous active substance emulsion (obtained from 10% emulsifiable concentrate). After the coating has dried, larvae of the colorado potatoe beetle (Leptinotarsa decemlineata) are applied to the plants.

The following table indicates the times in minutes and hours after which all beetles (100% are in the dorsalt position.

| | |
|---|---|
| O,O-dimethyl-S(oxazolo(4,5-b))pyridin-one-3-yl-methyl)-dithiophosphate | 30' |
| O,O-dimethyl-S-(oxazolo(4,5-b))pyridin-2(3H)-one-3-yl-ethyl-(1')-dithiophosphate | 60' |
| O,O-dimethyl-S-(oxazolo(4,5-b))-pyridin-2(3H)-one-3-yl-(2'-bromoethyl)-(1'))-dithiophosphate | 60' |
| O,O-diethyl-S-(oxazolo(4,5-b))-pyridin-2(3H)-one-3-yl-(2'bromoethyl)-(1'))-dithiophosphate | 50' |
| O,O-diethyl-S-(oxazolo(4,5-b))pyridin-2(3H)-one-3-yl-methyl)-thiophosphate | 90' |
| O,O-bis(2'-chloroethyl)-S-(oxazolo(4,5-b))-pyridin-2(3H)-one-3-yl-methyl)-dithiophosphate | 2ʰ |
| O,O-dimethyl-S-(6-chloro(oxazolo(4,5-b))-pyridin-2(3H)-one-3-yl-methyl)-thiophosphate | 60' |
| O,O-diethyl-S-(6-chloro(oxazolo(4,5-b))-pyridin-2(3H)-one-3-yl-methyl)-thiophosphate | 50' |
| O,O-diethyl-S-(6-chloro-(oxazolo(4,5-b))-pyridin-2(3H)-one-3-yl-ethyl-(1')-dithiophosphate | 60' |
| O,O-diethyl-S-(6-chloro-(oxazolo(4,5-b))-pyridin-2(3H)-one-3-yl-(2'bromoethyl)-(1'))-dithiophosphate | 90' |
| O,O-diallyl-S-(6-chloro-(oxazolo(4,5-b))-pyridin-2(3H)-one-3-yl-methyl)-dithiophosphate | 4ʰ |
| O-ethyl-S(6-chloro-(oxazolo(4,5-b))-pyridin-2(3H)-one-3-yl-methyl)-dithiophenylphosphonate | 5ʰ |
| O-methyl-S-(6-chloro-(oxazolo(4,5-b))-pyridin-2(3H)-one-3-yl-methyl)-dithiomethylphosphonate | 60' |
| O-methyl-N,N-dimethyl-S-(6-chloro-(oxazolo(4,5-b))-pyridin-2(3H)-one-3-yl-methyl)-dithio phosphorus amidate | 2ʰ |
| O,O-diethyl-S-(6-bromo(oxazolo(4,5-b))-pyridin-2(3H)-one-3-yl-methyl)-thiophosphate | 20' |
| O,O-dimethyl-S-(6-bromo-(oxazolo(4,5-b))-pyridin-2(3H)-one-3-yl-ethyl-(1')-dithiophosphate | 60' |
| O,O-dimethyl-S-(6-nitro-(oxazolo(4,5-b))-pyridin-2(3H)-one-3-yl-methyl)-dithiophosphate | 60' |
| O,O-diethyl-S-(6-nitro-(oxazolo(4,5-b))-pyridin-2(3H)-one-3-yl-methyl)-dithiophosphate | 60' |
| O,O-diethyl-S-(6-nitro-(oxazolo(4,5-b))-pyridin-2(3H)-one-3-yl-ethyl-(1'))-dithiophosphate | 60' |
| O,O-dimethyl-S-(oxazolo(4,5-b))-pyridin-2(3H)-thione-3-yl-methyl)-dithiophosphate | 5ʰ |

Example 32

Acaricidal action a. Action against mites (Tetranychus urticae) To test the acaricidal action, bean leaves that are attacked by adults, encystments and eggs of the red spider mite (Tetranychus urticae) are treated with an aqueous emulsion containing the test substance in a concentration of 0.1 %. The test subjects are strains of the red spider mite that are resistant to commercially available phosphorus esters.

| Active substances | Mortality in % within 6 days at an active substance concentration of 0.1 % | | |
|---|---|---|---|
| | Adults | Encystments | Eggs |
| O,O-dimethyl-S-(oxazolo(4,5-b))-pyridin-2(3H)-one-3-yl-methyl)-dithiophosphate | 100 | 100 | 87 |
| O,O-diethyl-S-(oxazolo(4,5-b))-pyridin-2(3H)-one-3-yl-ethyl-(1'))-dithiophosphate | 100 | 100 | 100 |
| O,O-dimethyl-S-(6-chloro-(oxazolo-(4,5-b))-pyridin-2(3H)-one-3-yl-methyl)-dithiophosphat | 100 | 100 | 100 |
| O,O-diethyl-S-(6-chloro-(oxazolo-(4,5-b))-pyridin-2(3H)-one-3-yl-methyl)-dithiophosphat | 100 | 100 | 50 |
| O,O-diethyl-S(6-chloro-oxazolo(4,5-b))-pyridin-2(3H)-one-3-yl-ethyl-(1'))-dithiophosphate | 100 | 100 | 97 |
| O,O-diethyl-S-(6-chloro-(oxazolo(4,5-b))-pyridin-2(3H)-one-3-yl-(2'-bromoethyl)-(1')-dithiophosphate | 80 | 50 | 50 |
| O-methyl-S-(6-chloro-(oxazolo(4,5-b))-pyridin-2(3H)-one-3-yl-methyl)-dithiomethylphosphate | 100 | 100 | 100 |

—Continued

| Active substances | Mortality in % within 6 days at an active substance concentration of 0.1 % | | |
|---|---|---|---|
| | Adults | Encystments | Eggs |
| O-ethyl-S-(6-chloro-(oxazolo(4,5-b))-pyridin-2(3H)-one-3-yl-methyl)-dithiomethylphosphate | 100 | 100 | 100 |
| O,O-dimethyl-S-(6-bromo-(oxazolo-(4,5-b))-pyridin-2(3H)-one-3-yl-methyl)-dithiophosphate | 100 | 100 | 98 |
| O,O-diethyl-S-(6-nitro-(oxazolo-(4,5-b))pyridin-2(3H)-on-3-yl-ethyl-(1'))-dithiophosphate | 95 | 95 | 40 |
| O,O-dimethyl-S-(oxazolo(4,5-b))-pyridin-2(3H)-thione-3-yl-methyl)-dithiophosphate | 100 | 57 | 63 |
| O,O-dimethyl-S(oxazolo(4,5-b))-pyridin-2(3H-one-3-yl-methyl)-thiophosphate | 100 | 100 | 100 |
| O,O-dimethyl-S-(6-chloro-(oxazolo-(4,5-b))-pyridin-2(3H)-one-3-yl-methyl)-thiophosphate | 100 | 100 | 100 |
| O,O-dimethyl-S-(6-bromo-(oxazolo(4,5-b))pyridin-2(3H)-one-3-yl-methyl)-thiophosphate | 100 | 100 | 100 |
| O-methyl-S-(oxazolo(4,5-b))pyridin-2(3H)-one-3-yl-methyl)-dithiomethylphosphate | 100 | 100 | 100 |
| O-ethyl-S-(oxazolo(4,5-b))-pyridin-2(3H)-one-3-yl-methyl-dithiomethylphosphonate | 100 | 100 | 100 |
| O-methyl-S-(6-chloro-(oxazolo-(4,5-b))pyridin-2(3H)-one-3-yl-methyl)-dithio-ethylphosphonate | 100 | 100 | 100 |
| O-ethyl-S-(6-chloro-(oxazolo-(4,5-b))pyridin-2(3H)-one-3-yl-methyl)-dithio-ethylphosphonate | 100 | 100 | 100 | b. Action against ticks (boophilus microplus)

Ten Adults, egg laying ticks of various strains are dipped for 3 minutes in an aqueous emulsion of active substance in a concentration of 0.1 %. The ticks are then kept at 27°C and 80% relative atmospheric humidity. On the 5th., 10th. and 15th. day, oviposition is determined. The eggs are kept for a further 20 days under the same conditions and the possible hatching rate determined.

| Active substance | Tick strain | oviposition | Hatching rate |
|---|---|---|---|
| O,O-diethyl-S-(oxazolo(4,5-b))-pyridin-2(3H)-one-3-yl-methyl)-dithiophosphate | Ridgeland | 0 | — |
| O,O-dimethyl-S-(oxazolo 4,5-b))-pyridin-2(3H)-one-3-yl-methyl)-dithiophosphate | Biarra | normal | 0 |
| O,O-diethyl-S-(oxazolo(4,5-b))-pyridin-2(3H)-one-3-yl-ethyl-(1'))-dithiophosphate | Biarra | 0 | — |
| O,O-diethyl-S-(oxazolo(4,5-b))-pyridin-2(3H)-one-3-yl-(2-bromo-ethyl)-(1'))-dithiophosphate | Biarra | 0 | — |
| O,O-dimethyl-S-(oxazolo(4,5-b))-pyridin-2(3H)-one-3-yl-methyl)-thiophosphate | Biarra | 0 | — |
| O,O-bis-(2'-methoxa-ethyl)-S-(oxazolo(4,5-b))pyridin-2(3H)-one-3-yl-methyl)-dithiosphosphate | Ridgeland | 0 | — |
| O,O-diallyl-S-(oxazolo(4,5-b))-pyridin-2(3H)-one-3-yl-methyl)-dithiophosphate | Ridgeland | 0 | — |
| O,O-dimethyl-S-(6-chloro(oxazolo(4,5-b))pyridin-2(3H)-one-3-yl-methyl)-dithiophosphate | Ridgeland | 0 | — |
| O,O-diethyl-S-(6-chloro-(oxazolo(4,5-b))pyridin-2(3H)-one-3-yl-methyl)-dithiophosphate | Ridgeland | 0 | — |
| O,O-dimethyl-S-(6-chloro-(oxazolo-(4,5-b))pyridin-2(3H)-one-3-yl-ethyl-(1'))-dithiophosphate | Biarra | 0 | — |
| O,O-diethyl-S-(6-chloro-(oxazolo-4,5-b))pyridin-2(3H)-one-3-yl-ethyl-(1'))-dithiophosphate | Biarra | 0 | — |

—Continued

| Active substance | Tick strain | oviposition | Hatching rate |
|---|---|---|---|
| O,O-dimethyl-S(6-chloro-(oxazolo(4,5-b))pyridin-2(3H)-one-3-yl-methyl)-thio-phosphate | Biarra | normal | 0 |
| O,O-dimethyl-S-(6-chloro-(oxazolo(4,5-b))pyridin-2(3H)-one-3-yl-methyl)-thio-phosphate | Ridgeland | 0 | — |
| O,O-methyl-S-(6-chloro-(oxazolo-(4,5-b))pyridin-2(3H)-one-3-yl-methyl)-dithio-methyl-phosphonate | Biarra | 0 | — |
| O,O-dimethyl-S-(6-bromo-oxazolo(4,5-b))pyridin-2(3H)-one-3-yl-methyl)-di-thiophosphate | Ridgeland | 0 | — |
| O,O-diethyl-S-(6-bromo-(oxazolo(4,5-b))pyridin-2(3H)-one-3-yl-methyl)-dithiophosphate | Ridgeland | 0 | — |
| O,O-diethyl-S-(6-bromo-(oxazolo-4,5-b))pyridin-2(3H)-one-3-yl-ethyl-(1'))-dithiophosphate | Biarra | 0 | — |
| O,O-dimethyl-S-(6-bromo-(oxazolo-(4,5-b))pyridin-2(3H)-one-3-yl-methyl)-thio-phosphate | Biarra | 0 | — |
| O,O-diethyl-S-(6-bromo-(oxazolo-(4,5-b))-pyridin-2(3H)-one-3-yl-methyl)-thio-phosphate | Ridgeland | 0 | — |
| | Biarra | 1/10 | 0 |
| O,O-dimethyl-S-(oxazolo(4,5-b))pyridin-2(3H)-thione-3-yl-methyl)-dithiophosphate | Ridgeland | 0 | — |
| O,O-diethyl-S-(oxazolo(4,5-b))pyridin-2(3H)-thio-3-yl-methyl)-dithiophosphate | Ridgeland | normal | 0 |

What we claim is:

1. An insecticidal and acaricidal composition comprising (1) an insecticidally and acaricidally effective amount of a compound of the formula

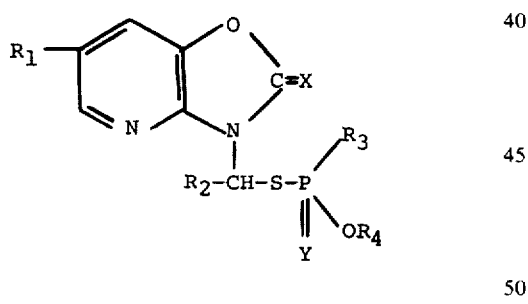

wherein
R₁ is hydrogen, chlorine, bromine or nitro,
R₂ is hydrogen, methyl, chloromethyl or bromomethyl,
R₃ is alkyl of from 1 to 4 carbon atoms, alkoxy of from 1 to 4 carbon atoms, alkenyloxy of from 2 to 4 carbon atoms, alkoxy-alkoxy having a total of from 2 to 4 carbon atoms, halogenalkoxy of from 1 to 4 carbon atoms, or phenyl,
R₄ is alkyl of from 1 to 4 carbon atoms, alkenyl of from 2 to 4 carbon atoms, alkoxyalkyl having a total of from 2 to 4 carbon atoms, or halogenalkyl of from 1 to 4 carbon atoms, and
each of X and Y represents oxygen or sulphur, and
(2) a carrier.

2. The composition of claim 1 in which the compound is

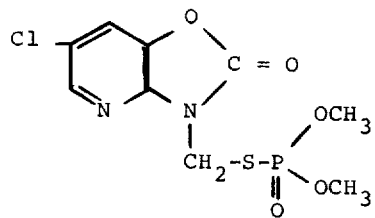

3. The composition of claim 1 in which the compound is

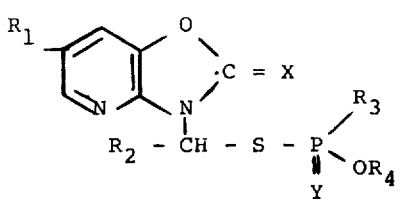

4. A method for controlling insects and acarids which comprises applying thereto an insecticidally and acaricidally effective amount of a compound of the formula wherein
R₁ is hydrogen, chlorine, bromine or nitro,
R₂ is hydrogen, methyl, chloromethyl or bromomethyl,
R₃ is alkyl of from 1 to 4 carbon atoms, alkoxy of from 1 to 4 carbon atoms, alkenyloxy of from 2 to 4 carbon atoms, alkoxyalkoxy having a total of from 2 to 4 carbon atoms, halogenalkoxy of from 1 to 4 carbon atoms, or phenyl,
R₄ is alkyl of from 1 to 4 carbon atoms, alkenyl of from 2 to 4 carbon atoms, alkoxyalkyl having a total of from 2 to 4 carbon atoms, or halogenalkyl of from 1 to 4 carbon atoms, and
each of X and Y represents oxygen or sulphur.

5. The method of claim 4 in which the compound is

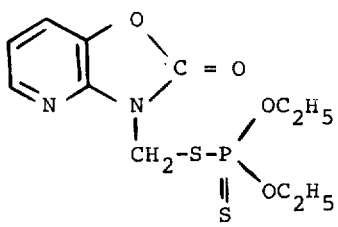

6. The method of claim 4 in which the compound is

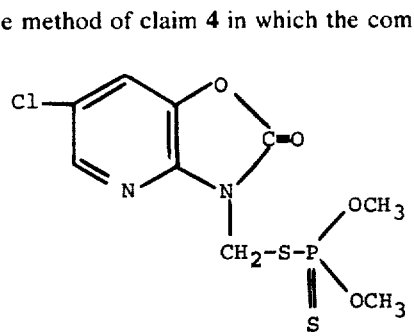

7. The method of claim 4 in which the compound is

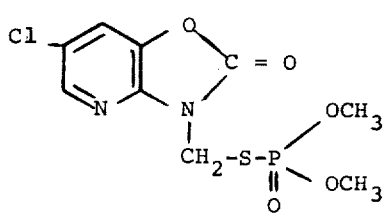

8. The method of claim 4 in which the compound is

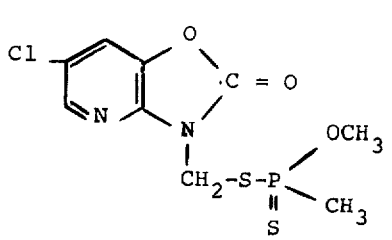

9. The method of claim 4 in which the compound is

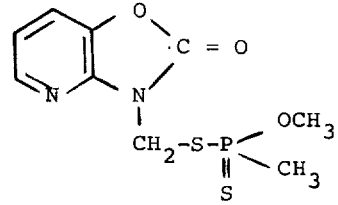

10. The method of claim 4 in which the compound is

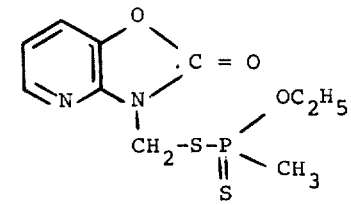

11. The method of claim 4 in which the compound is

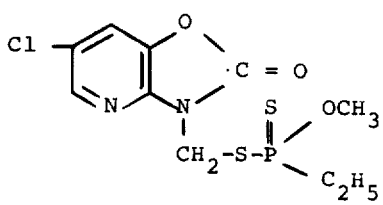

12. The method of claim 4 in which the compound is

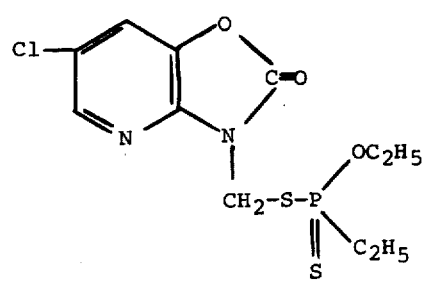

13. The method of claim 4 in which the compound is

14. The method of claim 4 in which the compound is

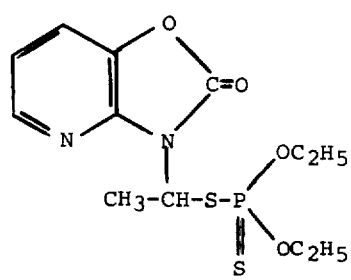

15. A method for controlling parasitic helminths which comprises applying thereto an anthelmintically effective amount of a compound of the formula

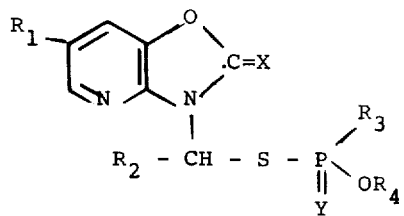

wherein
R₁ is hydrogen, chlorine, bromine or nitro,
R₂ is hydrogen, methyl, chloromethyl or bromomethyl,
R₃ is alkyl of from 1 to 4 carbon atoms, alkoxy of from 1 to 4 carbon atoms, alkenyloxy of from 2 to 4 carbon atoms, alkoxyalkoxy having a total of from 2 to 4 carbon atoms, halogenalkoxy of from 1 to 4 carbon atoms, or phenyl,
R₄ is alkyl of from 1 to 4 carbon atoms, alkenyl of from 2 to 4 carbon atoms, alkoxyalkyl having a total of from 2 to 4 carbon atoms, or halogenalkyl of from 1 to 4 carbon atoms, and
each of X and Y represents oxygen or sulphur.

16. The method of claim 15 in which the compound is

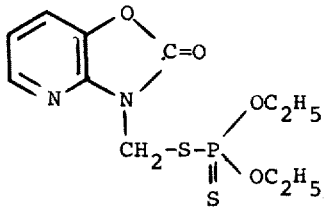

* * * * *